United States Patent
Tang et al.

(10) Patent No.: US 8,401,473 B2
(45) Date of Patent: Mar. 19, 2013

(54) APPARATUSES AND METHODS THAT FACILITATE THE TRANSFER OF POWER AND INFORMATION AMONG ELECTRICAL DEVICES

(75) Inventors: John Tang, San Carlos, CA (US); Greg Christie, Cupertino, CA (US); Jesse L. Dorogusker, Menlo Park, CA (US); Donald Novotney, San Jose, CA (US); Jeffrey J. Terlizi, San Francisco, CA (US); Terry Tikalsky, Sunnyvale, CA (US); Christopher D. McKillop, La Honda, CA (US); Stanley Rabu, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 941 days.

(21) Appl. No.: 11/823,923

(22) Filed: Jun. 28, 2007

(65) Prior Publication Data

US 2008/0166968 A1    Jul. 10, 2008

Related U.S. Application Data

(63) Continuation-in-part of application No. 11/620,669, filed on Jan. 6, 2007.

(51) Int. Cl.
*H04B 7/00* (2006.01)
(52) U.S. Cl. ............... 455/41.2; 455/573; 320/149
(58) Field of Classification Search .......... 455/41.2, 455/571–573; 320/149
See application file for complete search history.

(56) References Cited

U.S. PATENT DOCUMENTS

| | | | |
|---|---|---|---|
| 3,959,775 A | 5/1976 | Valassis et al. | |
| 4,850,006 A | 7/1989 | Sasaki et al. | |
| 5,680,026 A | 10/1997 | Lueschen | |
| 5,914,585 A | 6/1999 | Grabon | |
| 6,888,338 B1* | 5/2005 | Popescu-Stanesti et al. | 320/137 |
| 7,462,073 B2* | 12/2008 | Bell et al. | 439/639 |
| 7,589,536 B2 | 9/2009 | Terlizzi et al. | |
| 7,768,150 B2* | 8/2010 | Platania et al. | 307/19 |
| 7,813,715 B2 | 10/2010 | McKillop et al. | |
| 7,913,297 B2 | 3/2011 | Wyld | |
| 2003/0050102 A1* | 3/2003 | Roh | 455/573 |
| 2003/0078071 A1* | 4/2003 | Uchiyama | 455/557 |
| 2003/0125075 A1* | 7/2003 | Klovborg | 455/556 |
| 2004/0066174 A1* | 4/2004 | Choi | 320/149 |
| 2004/0085694 A1* | 5/2004 | Germagian et al. | 361/90 |
| 2004/0088465 A1* | 5/2004 | Bianchi | 710/303 |

(Continued)

FOREIGN PATENT DOCUMENTS

| | | |
|---|---|---|
| CN | 1747256 | 3/2006 |
| CN | 2821898 | 9/2006 |

(Continued)

OTHER PUBLICATIONS

U.S. Appl. No. 60/879,177, filed Jan. 6, 2007.

(Continued)

*Primary Examiner* — Nay A Maung
*Assistant Examiner* — Erica Fleming-Hall
(74) *Attorney, Agent, or Firm* — Womble Carlyle Sandridge & Rice LLP

(57) ABSTRACT

The present invention is directed to apparatuses, systems, methods, and computer readable media that can facilitate the transfer of power between at least two electrical devices. At least one of the electrical devices is preferably a battery operated device. The present invention may also be used to facilitate the transfer of information among electrical devices. For example, the present invention may be used to automatically pair two Bluetooth devices together.

22 Claims, 23 Drawing Sheets

U.S. PATENT DOCUMENTS

| | | | |
|---|---|---|---|
| 2004/0129522 A1* | 7/2004 | Skowronski | 191/12.2 R |
| 2004/0169072 A1* | 9/2004 | Peng | 235/375 |
| 2004/0172527 A1* | 9/2004 | Ono et al. | 713/100 |
| 2004/0246341 A1 | 12/2004 | Lee et al. | |
| 2005/0001590 A1* | 1/2005 | Bayne et al. | 320/128 |
| 2005/0130593 A1* | 6/2005 | Michalak | 455/66.1 |
| 2005/0189921 A1 | 9/2005 | Bayne et al. | |
| 2006/0017840 A1* | 1/2006 | Sawachi | 348/372 |
| 2006/0164036 A1* | 7/2006 | Ulla et al. | 320/114 |
| 2007/0054550 A1* | 3/2007 | Cuthbert et al. | 439/607 |
| 2007/0067659 A1* | 3/2007 | Tevanian | 713/324 |
| 2007/0136614 A1 | 6/2007 | Heath et al. | |
| 2008/0028237 A1* | 1/2008 | Knight | 713/300 |
| 2008/0034233 A1* | 2/2008 | Chuang et al. | 713/300 |
| 2008/0042616 A1* | 2/2008 | Monks et al. | 320/106 |
| 2008/0166968 A1 | 7/2008 | Tang et al. | |
| 2008/0265836 A1* | 10/2008 | Inoue et al. | 320/110 |
| 2009/0304217 A1* | 12/2009 | Thalheimer et al. | 381/334 |
| 2010/0079106 A1* | 4/2010 | Graham | 320/115 |

FOREIGN PATENT DOCUMENTS

| | | |
|---|---|---|
| EP | 1 406 366 A2 | 4/2004 |
| FR | 2841699 | 1/2004 |
| GB | 2 418 546 A | 3/2006 |
| KR | 2001-0026356 | 4/2001 |
| WO | WO2006/136195 | 12/2006 |

OTHER PUBLICATIONS

U.S. Appl. No. 60/879,195, filed Jan. 6, 2007.

* cited by examiner

APPARATUSES AND METHODS THAT FACILITATE THE TRANSFER OF POWER AND INFORMATION AMONG ELECTRICAL DEVICES

This application is a continuation-in-part of U.S. patent application Ser. No. 11/620,669, filed Jan. 6, 2007, the disclosure of which is hereby incorporated by reference herein in its entirety.

BACKGROUND OF THE INVENTION

This invention is related to transferring power and information among electrical devices. More particularly, this invention facilitates the transfer of power and information from one electrical device to at least one other electrical device.

Portable electrical devices are an everyday part of life in today's society. Among other things, portable electrical devices, such as iPods, PDAs and cell phones, provide entertainment, improve productivity and enable communication. Some devices can be used to provide additional functionality to another device. For example, a cellular telephone can enable a laptop computer to access the Internet. Other electrical devices are specifically designed to be an accessory device that enhances the functionality of a device. For example, a wireless Bluetooth headset enhances the use of a cellular telephone by allowing users to have a hands-free, wireless conversation through their cellular telephone.

As a result, many people often carry a number of personal electrical devices with them. It is not uncommon for people to have a cellular telephone, wireless headset and digital media device, like Apple's iPod, when they leave their homes.

Most portable electrical devices are powered by a rechargeable battery. Despite advancements in battery technology, many users often wish that the battery in their portable devices lasted longer. Another problem is that, frequently, each portable device has its own charger, which must be carried around. Inevitably, most users are left in a situation where one device has power, but the device that is needed at the moment does not. If the user does not have the right charger available, the user is out of luck.

In addition to carrying around more electrical devices, electrical devices are becoming more complex which causes a number of inconveniences to the user. For example, many different types of portable electrical devices can now be linked together using a number of different wired or wireless standards and/or protocols. Some of these standards and/or protocols, such as the Bluetooth standards, require the user to reconfigure the devices each time it is used to communicate with a new device (often referred to as "pairing"). The configurations can require, for example, that at least one of the devices is identified to the other device in some manner. For example, the pairing of a universal remote control with a particular electrical device (e.g., TV, cable box, etc.) requires the user to follow a series of steps, one of which includes entering a code that represents the brand and type of the device. This pairing process is the cause of great frustration among many users.

SUMMARY OF THE INVENTION

In accordance with the principles of the present invention, apparatuses, systems, methods, and computer readable media are discussed herein that can facilitate the transfer of power and information between at least two electrical devices. One or more of the electrical devices can be a portable, battery operated device. In the embodiments of the present invention that accommodate at least three devices, it is preferable that at least one of the devices has access to a reliable, continuous source of power (such as, for example, a wall power outlet).

It is preferred to have the devices electrically coupled to the ports of an apparatus in accordance with the principles of the present invention. The ports and other components of the apparatus can allow each of the devices coupled to the apparatus to be electrically coupled to at least one of the other devices.

Once the devices are electrically coupled together (via the apparatus), the apparatus's processor or microcontroller can facilitate the transfer of information and/or power among the devices. The transfer of information can, for example, allow two of the devices coupled to the apparatus to be automatically paired in accordance with a Bluetooth protocol. In some embodiments, certain conditions must be met (e.g., an absence of conflicting settings) before automatic pairing takes place.

The transfer of power among the devices can, for example, allow at least one device to charge at least one other device. The power from at least one of the devices can also be used to operate the apparatus and execute the automatic steps of methods described below that are in accordance with the present invention. In some embodiments the apparatus is only activated when a device is coupled to a particular port of the apparatus and/or when a particular device is coupled to a port of the apparatus.

The devices coupled to the apparatus can be assigned a priority (e.g., low, medium or high), which the present invention considers, among other things, when transferring power to and from each device. In at least one embodiment, the priority assigned to each device is based on which port the device is coupled to. The devices assigned a lower priority provide power and the devices assigned a higher priority receive power. Medium priority devices can receive and/or provide power in different situations. In some embodiments, each device provides power to only one device that is assigned the next higher priority (if there is one). For example, the medium priority device provides power to the highest priority device while it receives power from the lowest priority device. In addition, the apparatus can be programmed and/or hardwired to only act as a power and information conduit when a one or more particular ports are coupled to one or more devices.

In alternative embodiments, the microcontroller can utilize a more device-centric approach (as opposed to a port-centric approach) in which, for example, the apparatus assigns a priority to each device in response to the microcontroller identifying the device's type (as opposed to identifying the port that the device is coupled to). Similarly, the device can only be activated in response to a particular device being coupled to In addition to the components mentioned above, the present invention can also employ, for example, one or more switches, a regulator, a boost, and various connectors (e.g., single wires, multi-wire busses, nodes, etc.). All of the components of the present invention can be supervised and controlled by the microcontroller.

BRIEF DESCRIPTION OF THE DRAWINGS

The above and other features of the present invention, its nature and various advantages will be more apparent upon consideration of the following detailed description, taken in conjunction with the accompanying drawings, in which like reference characters refer to like parts throughout, and in which.

DETAILED DESCRIPTION OF THE DISCLOSURE

The present invention is directed to apparatuses, systems, methods and computer readable media that can facilitate the charging of a battery of at least one device as well as the transfer of information among different types of devices and platforms. The following is a description of various apparatuses and methods that can be used in accordance with various embodiments of the present invention.

Figure 1:
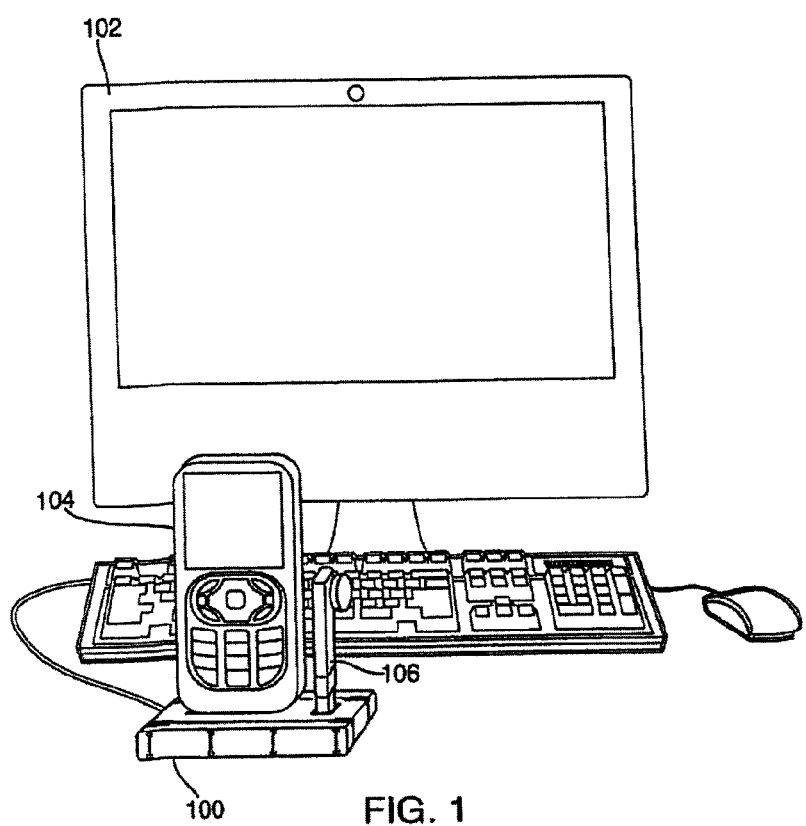
FIG. 1 shows an illustrative system that incorporates the present invention.

FIG. 1 illustrates docking station 100, which is electrically coupled to three devices. The three devices are iMac 102, cellular telephone 104 and wireless headset 106. Docking station 100 enables information and power to be exchanged among the devices. In at least one embodiment, docking station 100 communicates, identifies and authenticates each device before power is transferred to or from each device. Docking station 100 can also be used to facilitate the transfer of additional information among the devices.

Although the present inventions described below generally relate to portable, battery powered devices, iMac 102 is a line-powered device which receives power from a power cord and requires no batteries. Other examples of line-powered devices include devices that receive power from, for example, a solar panel, a generator, or any means other than a battery.

Cellular telephone 104 and wireless headset 106 are portable, battery powered devices. Battery powered devices, as referred to herein, include devices that have a self contained battery or draw power from a battery located externally to the device. Docking station 100 can, for example, facilitate the charging of the battery of wireless headset 106 with power that is from the battery of cellular telephone 104. Similarly, power from iMac 102 can be used to charge cellular telephone 104 and/or wireless headset 106. In some embodiments, wireless headset 106 is the same or substantially similar to the wireless headset discussed in commonly assigned U.S. Provisional Patent Application No. 60/879,177, filed Jan. 6, 2007, entitled "Wireless Headset", U.S. Provisional Patent Application No. 60/879,195, filed Jan. 6, 2007, entitled "Connector with Magnetic Detent", U.S. Provisional Patent Application No. 60/879,193, filed Jan. 6, 2007, entitled "Acoustic Design of Earbud in a Headset", which are hereby incorporated by reference in their entireties.

The configuration shown in FIG. 1 is merely illustrative of one way the present invention may be implemented. Additional configurations of a docking system that may be used to charge and transfer information to an electronic accessory (such as a wireless headset) from another electronic device (such as a cellular phone) are discussed in the P4672P1 Application, the P4672P2 Application and the P4672P3 Application. Many other possible configurations for the invention will be apparent to those skilled in the art having the benefit of the disclosure contained herein. The description of FIGS. 2-15, like FIG. 1, will therefore be understood to be illustrative and not limiting.

Figure 2:
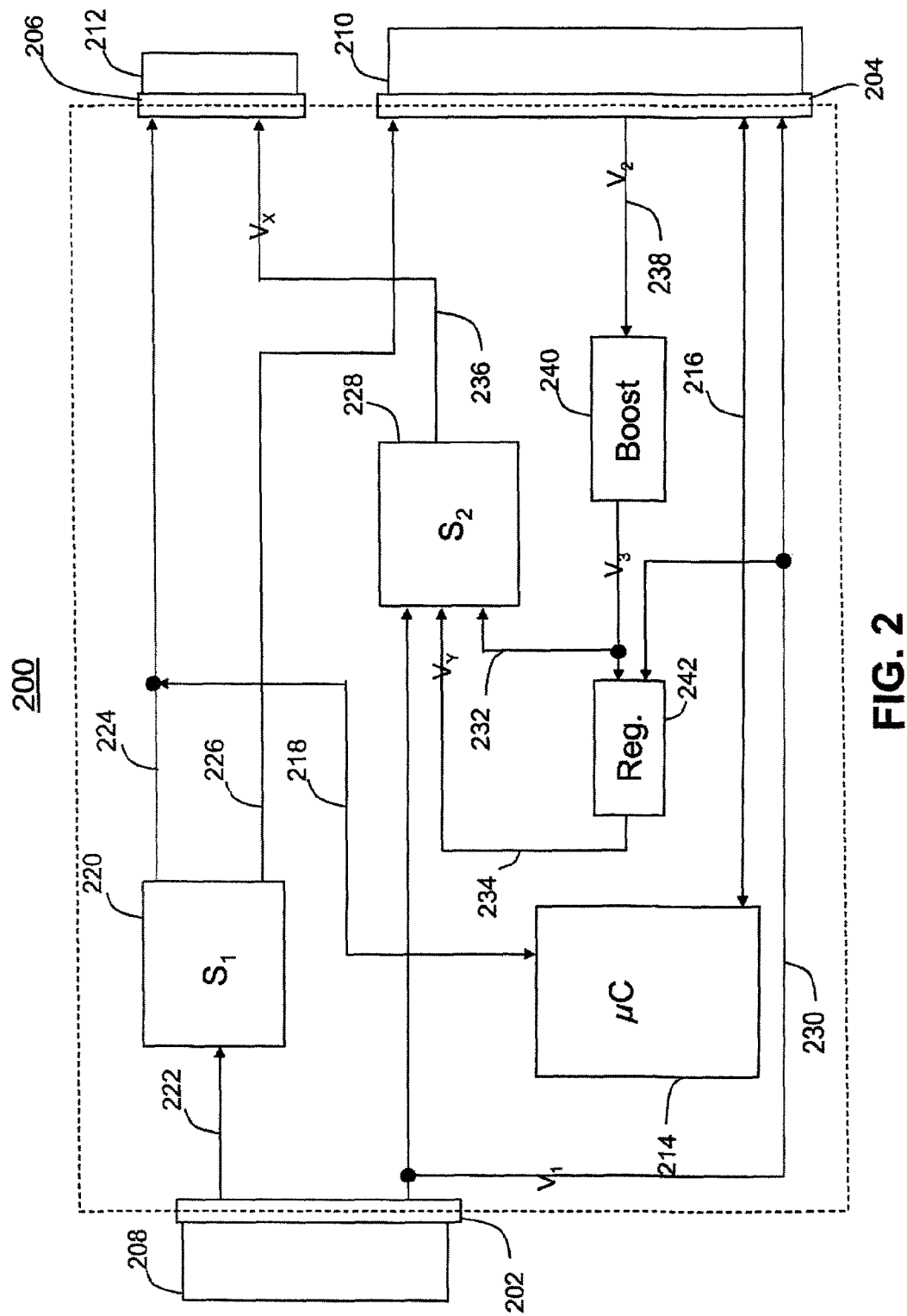
FIG. 2 shows a simplified schematic block diagram of an illustrative embodiment of circuitry in accordance with the present invention.

FIG. 2 a simplified schematic block diagram of circuitry that is located in apparatus 200. In some embodiments, apparatus 200 is substantially similar to docking station 100 of FIG. 1. Apparatus 200 is typically (although not necessarily) implemented using a single integrated circuit. Alternatively, apparatus 200 could be implemented, for example, using a multi-chip module including two or more separate integrated circuits.

Apparatus 200 can include port 202, port 204, and port 206, which enable devices 208, 210 and 212 to be coupled to apparatus 200. Devices 208, 210 and 212, which are discussed further below, can be similar to or the same as iMac 102, cellular telephone 104 and wireless headset 106, respectively. Apparatus 200 can also include microcontroller 214, line 216, line 218, switch 220, input 222, output 224, output 226, switch 228, line 230, line 232, line 234, output 236, line 238, boost 240 and regulator 242, which are also discussed in more detail below.

Ports 202, 204 and 206 are electrically coupled together by connections (i.e., wires, nodes, etc.) and/or other components of apparatus 200 that are described herein. Ports 202, 204 and 206 can be any type of port (e.g., wireless or wired), including those that receive any type of physical connector that can be used to couple apparatus 200 to any type of device, apparatus, cable, and/or component of a device or other apparatus. Ports 202, 204 and 206 can, for example, be used to couple either a male or female connector to apparatus 200. For example, port 202 can be a female USB connector, port 204 can be a male 30-pin connector, and port 206 can be symmetrical 4-pin connector, such as the connector described in the P4672P2 Application. For example, as discussed in the P4672P2 Application, port 202 can have magnetic properties and each of the four pins (referred to as contacts in the P4672P2 Application) are about 0.7 millimeters wide and are equally spaced about 1.0 millimeter apart. An exemplary 30-pin connector and an exemplary four pin connector are illustrated in FIG. 6c.

In alternative embodiments, ports 202, 204 and/or 206 can be removed and other ports (not shown) inserted. This would allow apparatus 200 to be coupled with various combinations of devices and/or cables. For example, if port 202 is a female USB connector, port 202 can be removed and replaced by a port that is a male USB connector (or any other type of connector).

One skilled in the art will also appreciate that there can be any number of ports included in apparatus 200. Despite FIG. 2 showing apparatus 200 as including three ports, an apparatus in accordance with the principles of the present invention can include more or less than three ports, thereby allowing any number of devices to be coupled to the apparatus at any given time. In embodiments where the apparatus includes only one port (discussed in more detail below in connection with FIGS. 7a and 7b), the apparatus may also include its own source of power, such as battery, solar panel, etc.

In alternative embodiments, apparatus 200 could facilitate the exchange of information and power among devices that are not physically coupled to apparatus 200. As such, devices can be electrically coupled to apparatus 200 wirelessly and information and/or power can be wirelessly exchanged through ports 202, 204 and/or 206.

The illustrative embodiment of FIG. 2 shows device 208 coupled to port 202, device 210 coupled to port 204, and device 212 coupled to port 206. Devices 208, 210 and 212 can be any battery powered or line-powered device. For example, devices 208, 210 and 212 can be any type of portable, fixed, and/or mobile device, including but not limited to a laptop computer, a desktop computer, an audio player (e.g., walkman, compact disc player, etc.), a video player, a media player (e.g., Apple's iPod, etc.), a set top box, a portable video game system (e.g., Sony's PSP, Nintendo's Game Boy, etc.), an electronic book, a cellular telephone, wireless telephone, a hand held computer, a GPS device, a flashlight, a personal digital assistant (PDA) (e.g., Palm's Pilot, etc.), a wireless headset for a telephone, a satellite radio, a remote control, an automobile key fob, a printer, an automobile radio, an automobile computing system, an automobile cigarette lighter (or other mobile power source, such as an airplane cigarette lighter), a camera, an accessory devices for a computer (e.g., wireless mouse, wireless keyboard, etc.), a watch, a surge protector, an AC/DC converter, etc.

Devices 208, 210 and 212 can also be any device that can serve as a source of power such as, for example, one or more batteries, a generator, a solar panel, a cable (USB cable, serial cable, FireWire, power cord, etc.), a capacitor, an inductor, or any other electrical or mechanical device (such as a winding device) that can be used to provide electricity to apparatus 200. In one embodiment of the present invention, at least two of devices 208, 210 and 212 are portable, battery powered devices.

In at least one embodiment, apparatus 200 includes microcontroller 214. Microcontroller 214 can use control lines (not shown) to communicate with any other component of apparatus 200 (described below) and/or any device coupled to apparatus 200 (e.g., devices 208, 210 and 212). In some embodiments, each control line can be a multiple-wire bus, which allows microcontroller 214 to communicate more efficiently with the components of apparatus 200 and devices 208, 210 and 212.

Microcontroller 214 can also include or have access to one or more computer readable media. Microcontroller 214 can provide intelligence to apparatus 200 by, for example, controlling the flow of power to and from ports 202, 204 and 206, communicating with the devices 208, 210 and 212 via the appropriate lines and ports (which are discussed further below), facilitating communications among devices 208, 210 and 212, determining how many and what types of devices are coupled to apparatus 200, prioritizing the devices that are coupled to apparatus 200, and monitoring the entire system for faults.

Microcontroller 214 can control the power transferred among devices 208, 210 and 212 by, for example, controlling the flow of power to and from ports 202, 204 and 206. When devices 208 and 210 are coupled to apparatus 200, microcontroller 214 can cause power to be transferred from device 208 to device 210 (and vice versa). The transferred power can be used to, e.g., charge the battery of device 210, to allow device 210 to operate more efficiently, to allow device 208 to communicate with device 210 (or vice versa), etc. Microcontroller 214 can also control the transfer of power from, for example, device 208 to device 212 (and vice versa), device 210 to device 212 (and vice versa), device 208 to devices 210 and 212 (and vice versa), and device 210 to devices 208 and 212 (and vice versa), and from device 212 to devices 210 and 212 (and vice versa). Methods for transferring power among multiple devices, which are in accordance with the present invention, are discussed in more detail below in connection with, for example, FIGS. 7-14.

Microcontroller 214 can use a communications path (which is discussed further below) to negotiate the transfer of power among the devices. Negotiating the transfer of power involves determining how much power should be provided to and/or from a device and can involve, for example, resetting a device. In some embodiments, microcontroller 214 can perform a hard reset on a device, which restarts the hardware of the device, and/or a soft reset that restarts the software of a device. One skilled in the art would appreciate that any other type reset can also be performed (such as a reset that resets the polarity of the ports of a device). Some devices, such as device 212, can be reset in response to receiving a power spike (e.g., a particular voltage for a relatively brief period of time, such as less than one millisecond). In some embodiments, apparatus 200 provides a power spike to one or more particular ports prior to acting as a conduit of power and information to that port.

In other embodiments, apparatus 200 can identify a device and then initiate the reset of the device as appropriate. For example, when/after device 214 is coupled to apparatus 200, apparatus 200 (or another device coupled to apparatus 200) identifies device 214 as a device that is reset when device 214 receives a power spike (e.g., receives power that exceeds a threshold, such as 4.5 volts). The power spike can be derived from a power source stored within apparatus 200 (e.g., a capacitor, battery, etc.) and/or derived from a device (such as device 208 and/or device 210).

In addition to resetting a device, negotiating the transfer of power can include other communications between microcontroller 214 and a device. For example, after microcontroller 214 identifies a device (which is discussed further below), microcontroller 214 can communicate with the device in order to place the device in a high power mode. The high power mode can be unique to a particular device and will allow a device to give more power to one or more other devices. For example, some iPods have a high power mode that allows the iPod to output a given voltage at a higher current (compared to when the device is in a default mode). Some devices only enter a high power mode after the appropriate handshaking (i.e., identification, authentication, etc.) occurs.

Microcontroller 214 can consider any number of variables in determining which devices provide power and which receive power. For example, microcontroller 214 can base that determination on the priority of the ports of apparatus 200 (which is discussed below in more detail in connection with, for example, FIGS. 8-15) or the priority of the devices (which is discussed below).

Microcontroller 214 can also determine which devices give and receive power based on, for example, the amount of excess power each device has available. For example, microcontroller 214 can transfer power from the device(s) with more excess power to the device(s) with less excess power. To gauge the amount of excess power a device has, microcontroller 214 can consider, for example, the remaining battery power, the length of time a battery powered device can run before the battery needs to be charged, and/or whether or not a device is coupled to another source of power (such as a wall outlet, a large back-up battery, a generator, a solar panel, etc.).

Microcontroller 214 can also, for example, direct the flow of power through apparatus 200 in response to receiving a user indication via a user interface. The user can, for example, select one or more physical buttons on apparatus 200 (not shown). Microcontroller 214 may also direct the flow of power in response to interactions the user has with the user interface(s) of device(s) 208, 210 and/or 212 (not shown).

In addition to controlling the power provided and received by each device coupled to apparatus 200, microcontroller 214 can communicate with any other component of apparatus 200 or any device coupled to apparatus 200 via the control lines (not shown) that were discussed above. Microcontroller 214 can also facilitate the transfer of information among the devices coupled to apparatus 200 using the components and wires described below.

In some embodiments, the information transferred from a first device to a second device may include, for example, software or a firmware update for the second device. A first device (such as a cellular telephone or computer) can be used to update the firmware or provide additional software to a second device (such as a wireless headset). For example, a firmware update for a wireless headset may be downloaded onto a computer (via the internet and into, e.g., iTunes) or cellular telephone (via the cellular telephone network) from a central server (such as the Apple server). When computer or cellular telephone and the wireless headset are coupled to apparatus 200, the information can be relayed from the computer or cellular telephone to the wireless headset via apparatus 200. In some other embodiments, apparatus 200 may facilitate the transfer of the information outside of apparatus 200, which is discussed in more detail below.

Information can be passed between devices directly or indirectly through apparatus 200. When microcontroller 214 establishes direct communications between two devices, the signal can be routed through various components of apparatus 200 (e.g., ports 202, 204 and/or 206, switch 220, etc.), but the communications are not routed through microcontroller 214. An example of a direct communications path between device 208 and device 210 is port 202 to input 222 to switch 220 to output 224 to port 204 (and vice versa). When microcontroller 214 facilitates the transfer of information via an indirect communications path, the information passes through microcontroller 214 (via the control lines (not shown), line 216 and/or line 218).

When using an indirect communications path, microcontroller 214 can, for example, monitor the information (for, e.g., faults, clarity, viruses, content, etc.). An indirect communications path can also allow microcontroller 214 to approve the information (based on, for example, parental restrictions, etc.) and/or save the information to internal or external memory, which may be RAM, ROM, flash memory, etc. (not shown). The information and/or an indication that information is being exchanged may also be displayed on a user interface (such as one or more light emitting diodes ("LEDs") or any other interface device apparatus 200 has access to, which are not shown). Microcontroller 214 may also encode/decode the information, and/or utilize the information in any other way. An example of an indirect communications path between devices 210 and 212 is port 204 to line 216 to microcontroller 214 to line 218 to line 224 to port 206 (or vice versa), all of which are discussed further below.

Communication paths are used to exchange information among the devices. Microcontroller 214 can also use a communications path between microcontroller 214 and any device. For example, before establishing a communications path between device 208 and device 210, microcontroller 214 can establish a communications path between microcontroller 214 and device 208. Microcontroller 214 may then use that communications path to, for example, identify and authenticate device 208. After communicating with device 208, microcontroller 214 can, for example, determine that device 208 has information for device 210. Microcontroller 214 can then establish a communications path with device 210, determine what communications protocol(s) can be used, identify device 210, authenticate device 210, and determine whether or not device 210 should communicate with device 208. If microcontroller 214 determines that device 208 can be permitted to communicate directly with device 210, microcontroller 214 will then establish a direct connection between device 208 and device 210, thereby enabling devices 208 and 210 to exchange information.

In some embodiments of the invention, when a device is coupled to a port of apparatus 200, microcontroller 214 receives a signal from the port via a control line (not shown) indicating that a device has been coupled to the port. In some embodiments, microcontroller 214 can monitor each port of apparatus 200 and detect when a device is coupled to port 202, port 204 and port 206. In response to receiving an indication from a port or detecting that a device is coupled to a port, microcontroller 214 automatically establishes a communications protocol (between the device and microcontroller 214 and/or the other devices), identifies the device, and authenticates the device.

For example, if a computer is coupled to port 202, microcontroller 214 can communicate with the computer and identify different characteristics of the computer (such as the computer's brand, model, name, operating system, communication protocol, etc.). As another example, if a cellular telephone and is coupled to port 204, microcontroller 214 can communicate with the cellular telephone and identify the model, brand, and other characteristics of the cellular telephone. In this manner microcontroller 214 is able to determine how many and what types of devices are coupled to apparatus 200. Apparatus 200 can use this data (i.e., how many and/or what types of devices are couple to it) and/or any other data to initiate and/or control the flow of power and information through apparatus 200 (e.g., only allow power to be transferred via apparatus 200 when there is a device coupled to port 202) (discussed below).

In addition to controlling the components of apparatus 200 via the control lines (not shown), microcontroller 214 can also exchange information with any of the components of apparatus 200 as well as devices 208, 210 and 212. For example, microcontroller 214 can exchange information (or facilitate indirect communications) with device 210 via line 216 and port 204. As another example, microcontroller 214 can exchange information (or facilitate indirect communications) with device 212 via line 218, which ties directly into output 224 (discussed below), and port 206. Lines 216 and 218 are preferably bidirectional multi-wire buses that carry information using at least two wires, but in some alternative embodiments either or both of lines 216 and 218 can be a single wire.

As mentioned above, before microcontroller 214 facilitates communications among the devices, microcontroller 214 can create a communications path. Creating a communications path can include suggesting or determining the protocol and/or standard (e.g., USB, serial, etc.) that is used to transmit information to/from each device that is coupled to apparatus 200. When three or more devices are coupled to apparatus 200, microcontroller 214 can facilitate communications using different types of communication protocols between different pairs of devices and/or between a device and microcontroller 214.

For example, when microcontroller 214 detects that devices 208, 210 and 212 are coupled to the ports 202, 204 and 206, respectively, microcontroller 214 can create a direct communications path (e.g., via switch 220) between devices 208 and 210 in which information is exchanged using a USB protocol. Microcontroller 214 can also, for example, concurrently facilitate indirect communications between devices 210 and 212 (via, e.g., line 216, line 218, and output 224), using a different serial data transfer standard.

In some embodiments, microcontroller 214 can specify which type of communications protocol is being used by providing, for example, a specific voltage to the device (e.g., 5 volts can indicate USB, 3 volts can indicate serial, etc.). This is discussed further below.

The present invention can use multiple communications standards and/or protocols concurrently when different devices and components are communicating. For example, when device 208 is a USB compatible device, a USB communications protocol can be used. When device 210 is also a USB compatible device, microcontroller 214 can facilitate direct communications between devices 208 and 210 (via switch 220).

In alternative embodiments, when device 210 is unable to communicate directly with device 208, microcontroller 214 can facilitate indirect communications between devices 208 and 210. For example, when device 210 is not USB compatible and device 208 may only communicate using a USB protocol, microcontroller 214 can facilitate indirect communications between devices 208 and 210. Microcontroller 214 can, for example, receive information from device 208 using a USB protocol and then relay the information to device 210 using another protocol.

Some devices can communicate with multiple devices and/or multiple communications protocols at the same time. For example, port 204 can be a 30-pin connector, which would enable device 210 to communicate indirectly with device 212 using a first communications protocol while device 210 communicates directly with device 208 using the first or a second communications protocol.

In some embodiments, microcontroller 214 facilitates all the communications among the devices coupled to apparatus 200. In some embodiments, the type of communications path (i.e., the communications protocol used, direct or indirect, etc.) that is established between devices can be based on, for example, the priority of the port to which each device is coupled, the type of device, the type and/or number of communications protocols each device is compatible with, etc.

In addition it may be desirable for microcontroller 214 to facilitate the transfer of communications and/or power based on a relative priority of ports 202, 204 and 206. The priority of ports 202, 204 and 206 can be based on, for example, how apparatus 200 is hardwired and/or the software running on microcontroller 214. In some embodiments, microcontroller 214 may automatically determine the priority of ports 202, 204 and 206 in response to the various information available to microcontroller 214 (e.g., the types of ports currently included in apparatus 200, the other components included in apparatus 200, etc.).

The relative priority of ports 202, 204 and 206, in some embodiments, can control which devices provide power and which devices receive power. For example, when devices 208, 210 and 212 are coupled to ports 202, 204 and 206, respectively, device 208 can be the lowest priority device (because, e.g., port 202 is the lowest priority port) and device 212 can be the highest priority device (because, e.g., port 206 is the highest priority port). Microcontroller 214 can facilitate the transfer of power from device 208 (which is coupled to the lowest priority port) to the higher priority ports (e.g., ports 204 and 206), thereby allowing the devices coupled to the higher priority ports (i.e., devices 210 and 212) to be charged by device 208. Microcontroller 214 can also, for example, transfer power from device 208 to device 210, while it routes power from device 210 to device 212.

When the lowest priority port is not connected to a device (e.g., when device 208 is not coupled to port 202), microcontroller 214 can assign another port (e.g., port 204) the lowest priority. Microcontroller 214 can route power from the device coupled to that port (e.g., device 210) to at least one device coupled to at least one higher priority port (e.g., device 212). As used herein, the terms "low priority" and "high priority" are not intended to suggest anything more than "which port(s)/device(s) should provide power" and "which port(s)/device(s) should receive power," respectively.

In alternative embodiments, microcontroller 214 can assign priority to the devices coupled to apparatus 200 (e.g., devices 208, 210 and/or 212) as opposed to ports 202, 204 and 206. Microcontroller 214 can use the information available to the microcontroller to prioritize the one or more devices coupled to apparatus 200. For example, when prioritizing the devices, microcontroller 214 may consider the number of devices coupled to apparatus 200, the types of devices coupled to apparatus 200, information the user provides to apparatus 200 via a user interface (not shown), the chronological order in which the devices are coupled to apparatus 200, etc.

The priority of the devices, similar to the priority of the ports, can be used to control the flow of power (and, in some embodiments, the flow of information) among the devices coupled to apparatus 200. For example, when devices 208, 210 and 212 are coupled to apparatus 200, device 208 can be assigned the lowest priority and device 212 can be assigned the highest priority, regardless as to which port each device is coupled to. Microcontroller 214 can, for example, direct power from the power supply of at least one lower priority device to the power supply of at least one higher priority device, thereby charging the higher priority device (e.g., devices 210 and 212) with power provided by the lower priority device.

When the lowest priority device (e.g., device 208) is disconnected or otherwise decoupled from apparatus 200, another device (e.g., device 210) can now be assigned the lowest priority. Microcontroller 214 can once again route power from the lowest priority device (e.g., device 210) to at least one higher priority device (e.g., device 212).

Microcontroller 214 can also monitor apparatus 200 and any device coupled to apparatus 200 for faults. In response to detecting a fault, microcontroller 214 can attempt to repair the fault and/or report the fault (to, for example, one or more of the devices coupled to apparatus 200, to a user interface of apparatus 200 (not shown), etc.). One skilled in the art would understand that microcontroller 214 can take any other appropriate action.

In some embodiments microcontroller 214 can facilitate communications between two or more devices that take place wirelessly or with a wired connection outside of apparatus 200. Microcontroller 214 can facilitate communications between two devices by first, for example, identifying and authenticating the two devices that are coupled to apparatus 200, and then establishing a communications protocol, which can be wireless, between the two devices. Information may then be exchanged between the two devices wirelessly.

For example, apparatus 200 can be used to automatically pair two devices together, which can alleviate the need for a user to enter, for example, a device code. One example of a device code is the code used to program a universal remote control. Another, more complicated device code is a Bluetooth pin, which allows Bluetooth enabled devices to be paired together, forming a trusted relationship, while preventing the devices from be paired with other devices that happen to be nearby. In some embodiments, after exchanging the device code via the components and wires of apparatus 200, the pairing process may continue wirelessly between the devices. In other embodiments, microcontroller 214 may facilitate the entire pairing process using the wires and components of apparatus 200. Automatically pairing two devices together is discussed in more detail below in connection with FIG. 4.

In some embodiments, apparatus 200 can include a wireless emitter and/or receiver (not shown) which can allow microcontroller 214 to, for example, communicate wirelessly with a device. In some embodiments, microcontroller 214 may access and use a wireless emitter and/or receiver that is built into a device (such as a cellular telephone) that is coupled to apparatus 200.

In alternative embodiments, microcontroller 214 can be omitted from apparatus 200. In yet other alternative embodiments, microcontroller 214 can be replaced by a component that provides only some of the functionality of microcontroller 214 that is described herein.

Regardless as to whether or not an embodiment of the present invention includes microcontroller 214, a microcontroller that provides less functionality than described herein, or no microcontroller at all, power and information could still be transferred from a first device to a second device. For example, two devices can communicate via an additional wire (not shown), wirelessly (e.g., using a Bluetooth standard and protocol (i.e., IEEE 802.15.1), a WiFi standard and protocol (i.e., any of the IEEE 802.11 standards), etc.), or by any other means. (One skilled in the art would appreciate that the term wire as used throughout this invention disclosure is not intended to limit the present invention to using threads of metal, but rather is intended to encompass any and every means for electrically coupling two electrical components together.) As such, communications among the devices that do not pass through apparatus 200 can, for example, preserve some or all of the functionality provided by microcontroller 214 in embodiments of the present invention that omit a microcontroller or include microcontrollers that have less functionality than microcontroller 214.

In some embodiments of the present invention, apparatus 200 can include one or more switches. For example, apparatus 200 can include switch 220 and switch 228, which receive input control signals from microcontroller 214 (via the control lines that are not shown).

In some embodiments of the present invention, switch 220 controls the flow of information from the device coupled to port 202 to the devices coupled to ports 204 and 206. Preferably, switch 220 receives information from port 202 via input 222. Input 222 can carry, for example, information signals, power, ground, etc. Input 222 is preferably a multiple-wire bus (e.g., a four-wire bus, a twisted pair, etc.).

One skilled in the art would appreciate that in alternative embodiments of the present invention, switch 220 can receive at least one additional input (e.g., a two-wire bus, a single wire input, a larger bus, etc.) (not shown) from any other component of apparatus 200 (e.g., from port 204, port 206, etc.). When, for example, switch 220 receives an input from port 204, device 210 can also serve as a source of information. Switch 220 can then be used to provide the information from device 210 to components of apparatus 200 and/or other devices. For example, a two-wire bus from port 204 to switch 220 would allow apparatus 200 to establish a direct communications path between devices 210 and 212, thereby allowing a master-slave relationship to be initiated (such as the Bluetooth pairing process) between device 210 and device 212.

In some embodiments, input 222 can provide information to switch 220 using any protocol and/or standard. For example, information sent via a USB protocol or any other protocol(s) can be accepted and/or understood by apparatus 200. For simplicity, the present invention is described herein as using only two data transfer standards, i.e., the USB standard and another serial data transfer standard which is referred to herein as the serial standard. The choice of this language is not meant to limit the present invention to such standards, but rather to simplify the discussion of the present invention. One skilled in the art would appreciate that a number of other standards and/or protocols can be used to send signals and/or transfer data among ports 202, 204, 206, other components of apparatus 200, and devices 208, 210, and 212. The standards and/or protocols used to communicate with each device coupled to apparatus 200 can be based on, for example, the priority of the devices, the type of devices, the components of apparatus 200 (e.g., the types of parts of apparatus 200, etc.), etc.

In some embodiments of the present invention, switch 220 has two outputs, i.e., output 224 and output 226. Outputs 224 and 226 can be single wires or multiple wire buses. Output 224 is preferably a two-wire bus to port 204. Output 226 is preferably a two-wire bus to port 206. Switch 220 can couple input 222 with output 224 and/or output 226 in response to the control signal that microcontroller 214 sends to switch 220. For example, switch 220 can couple input 222 to output 224, output 226, or both, thereby allowing electricity (which may or may not contain information) to flow from device 208 to port 204, port 206, or both, respectively.

In alternative embodiments that include a second input (such as, e.g., an input from a wireless receiver, port 204, etc.), switch 220 can couple, for example, input 222 to output 226 and the second input to output 226, thereby allowing information to flow from device 208 to device 210 and from the second input to device 212.

It is desirable for input 222, output 224 and output 226 to carry information using multiple standards and/or protocols (e.g., USB, etc.). In alternative embodiments, input 222, output 224 and output 226 can carry power that charges a device.

As discussed above, microcontroller 214 can assign a relative priority to ports 202, 204 and 206 (as opposed to assigning a priority to devices 208, 210 and 212). FIG. 2 illustrates an embodiment in accordance with the present invention, which includes components and connections that would improve the efficiency of the flow of power based on the prioritization of the ports. For example, apparatus 200 includes line 230, which allows power to automatically flow from port 202 to port 204 when device 208 is coupled to apparatus 200. As another example, when device 208 is coupled to apparatus 200, line 230 is intended to maintain a particular DC voltage, which is referred to herein as V1 (e.g., 5 volts, 4.7 volts, etc.). As such, line 230 can be used to charge device 210.

In some embodiments, microcontroller 214 can monitor the voltage provided by, for example, device 208 and facilitate the transfer of power between, for example, ports 202 and 204 on line 230. When device 208 (or any other device) is unable to provide a particular amount of power (because its power supply is running low) on a wire (such as line 230), microcontroller 214 can restrict the flow of power on the wire (or any other connector). Restricting the flow of power on a wire can prevent a device (e.g., device 208) from being drained of power by another device (e.g., device 210).

In alternative embodiments, power can be transferred from port 202 to port 204 without microcontroller 214 being involved (e.g., when line 230 is hard-wired to do so). Also, some alternative embodiments (e.g., embodiments wherein microcontroller 214 prioritizes each device, wherein apparatus 200 is designed to distribute the net available power from all of the devices evenly among each of the devices, etc.), microcontroller 214 can allow power to flow in both directions on line 230.

The embodiment of the present invention also includes switch 228. Switch 228 can be included in apparatus 200 for a number of reasons. It is desirable to use switch 228 to facilitate the charging of device 212 (i.e., the device coupled to the highest priority port), device 210 (i.e., the device coupled to the medium priority port), or both devices 210 and 212 with power from device 208.

In some embodiments, in addition to a control line from microcontroller 214 (not shown), switch 228 receives line 230, line 232, and line 234 as inputs. Line 230, as mentioned above, allows power to flow from port 202 and, preferably, maintains a particular voltage referred to herein as V1. Line 232 is a wire that allows power to flow from port 204 via line 238 and boost 240. Preferably, line 232 maintains a particular DC voltage, which is referred to herein as V2 (e.g., 3 volts, 3.3 volts, 3.8 volts, etc.). Line 234 is a wire that allows power to flow from ports 202 and/or 204 (via line 230 and/or line 238 and boost 240, respectively) through regulator 242 to switch 228. Apparatus 200 can maintain a particular DC voltage on line 234 referred to herein as V3 (e.g., 4.7 volts, 4.5 volts, etc.), which is preferably less than V1 but greater than V2.

In some embodiments, output 236 is a wire that allows power to flow from switch 228 to port 206 (i.e., the highest priority port). As such, switch 220 allows device 212 to receive power when at least one of devices 208 and 210 are coupled to apparatus 200. Microcontroller 214 can cause switch 228 to couple line 230, line 232 or line 234 to output 236. FIGS. 8-15 discuss some examples of how microcontroller 214 determines which input line is coupled to output 236.

In addition to charging a device, the voltage on any wire of apparatus 200 can be used to provide information to any device coupled to apparatus 200. For example, the voltage on output 236, i.e., Vx, can indicate to device 212 the type of communication protocol (e.g., USB, serial, etc.) that is being or will be used to provide device 212 information. As another example, apparatus 200 can cause device 212 to reset or recalibrate, for example, the polarity of the ports of device 212 in response to a particular voltage or range of voltages being maintained on output 236. Systems and methods for resetting the polarity of the ports of a device are discussed in commonly assigned U.S. patent application Ser. No. 11/650,130, filed Jan. 5, 2007, entitled "Systems and Methods for Determining the Configuration of Electronic Connections", which is hereby incorporated by reference in its entirety. As such, microcontroller 214 can use, for example, switch 228 to notify device 212 the type of data transfer protocol that device 212 should expect from output 224 and/or which wires of output 224 (when output 224 is a multi-wire bus) will be carrying information to device 212.

In some embodiments, apparatus 200 would include both boost 240 and regulator 242. Boost 240 can increase the voltage maintained on line 238 to a higher voltage (e.g., V3), which is then maintained on line 232. Regulator 242 can decrease the voltage on line 230 and/or line 232 to be any voltage, which is referred to herein as Vy.

The embodiment includes boost 240 and regulator 242 because different devices are charged more efficiently with different amounts of power. For example, an iPod can be charged most efficiently if 5 volts is provided to it, whereas an accessory device (e.g., a remote control, Bluetooth headset, etc.) can be charged most efficiently when 4.7 volts is provided to it. One skilled in the art would understand that the present invention can facilitate the transfer of power at any voltage or any range of voltages (e.g., 4.7 volts, 4.6-4.8 volts, 4.9-5.1 volts, 3.1-3.3 volts, 0-5.0 volts, 5-12 volts, etc.) and at any current or any range of currents.

In alternative embodiments, boost 240 and/or regulator 242 can be omitted from apparatus 200. One skilled in the art would also appreciate that V3 can be the same voltage as V1 or V2. Similarly, in alternative embodiments, V1 can be the same voltage as V2.

Figure 3:
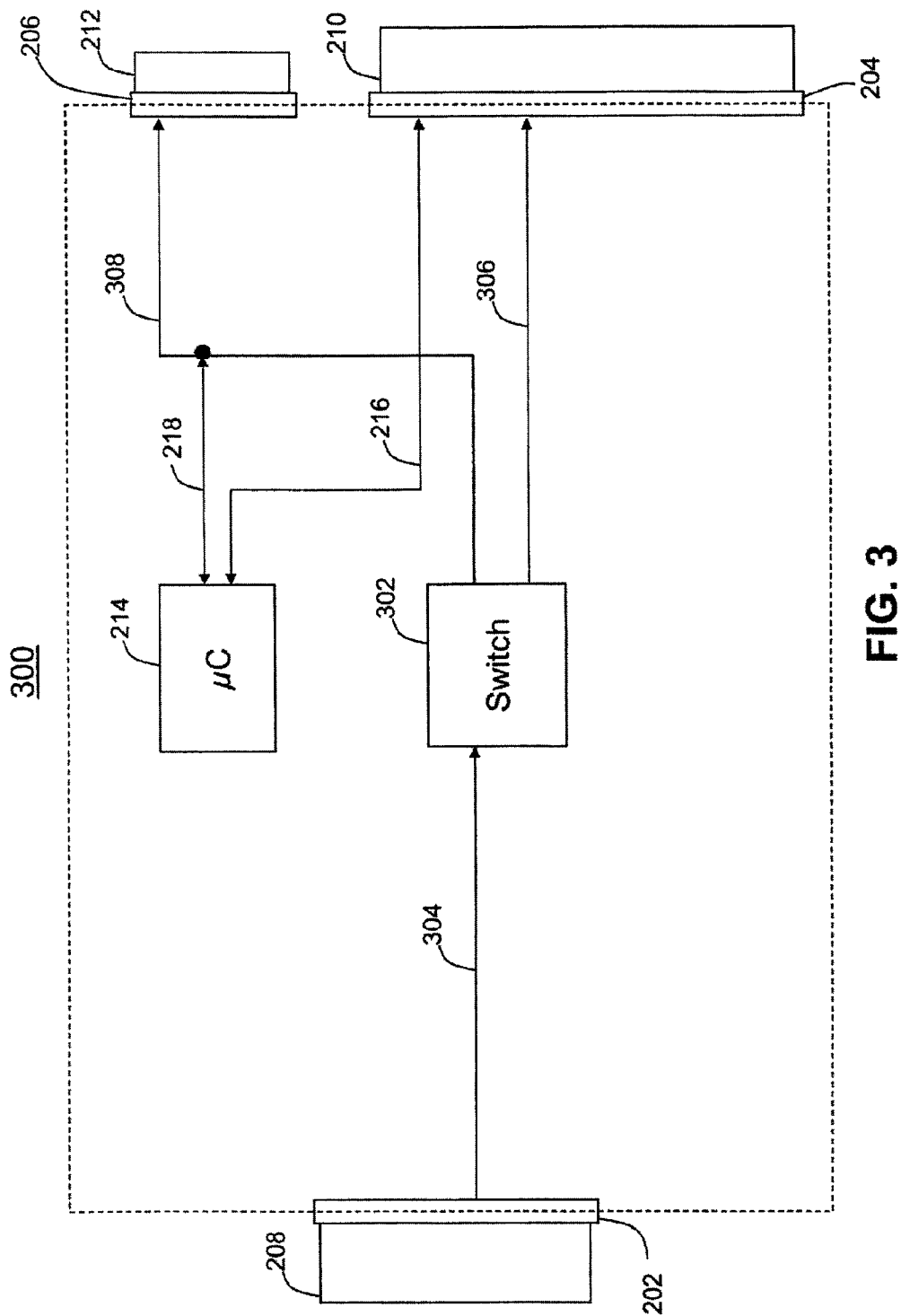
FIG. 3 shows a simplified schematic block diagram of an illustrative alternative embodiment of circuitry in accordance with the present invention.

FIG. 3 shows a simplified schematic block diagram of circuitry implemented in apparatus 300, which is an illustrative example of an alternative embodiment of the present invention. The circuitry implemented in apparatus 300 is similar to the circuitry implemented in apparatus 200 of FIG. 2 in that both apparatus 200 and apparatus 300 can facilitate the transfer of information and power among the devices coupled to them. Persons skilled in the art will appreciate that, in various embodiments of the present invention, similar or identical components can be utilized to perform similar or identical functions. Particularly, components 2XX of FIG. 3 are similar or the same as components 2XX of FIG. 2.

Apparatus 300 includes port 202, port 204, port 206, device 208, device 210, device 212, microcontroller 214, line 216, line 218, switch 302, input 304, output 306 and output 308. Apparatus 300 is different than apparatus 200 in that apparatus 300 includes fewer components than apparatus 200.

Switch 302 receives input 304 as an input. Input 304 can be a multi-wire bus (e.g., 2, 3, 4, etc. wire bus) that carries information and power from device 208 (via port 202) to switch 302. The functionality of line 304 can be similar to the combined functionality of lines 222 and 230 of FIG. 2.

Switch 302 is illustrated as having two outputs, i.e., outputs 306 and 308. Output 306 allows switch 302 to transfer information and power to device 210 via port 204. Output 308 allows switch 302 to transfer information and power to device 212 via port 206. Switch 302 can couple input 304 with either output 306 and/or output 308 based on the instructions microcontroller 214 sends to switch 302 via a control line (not shown). The control lines of apparatus 300 are similar to or the same as the control lines described above in connection with apparatus 200.

As mentioned above, this discussion is intended to illustrate exemplary embodiments of the present invention and is not intended to limit the present invention in any manner. For example, one skilled in the art would appreciate that additional components and connectors can be added to the embodiments described herein without departing from the spirit of the present invention. For example, one or more LEDs can be included in any embodiment of the present invention. One skilled in the art would also appreciate that the functionality of multiple components and/or wires described herein can be combined or divided. For example, input 304 can be divided into multiple inputs (e.g., a power input and an information input), which would enable, for example, switch 302 to provide information from device 208 to device 210 and power from device 208 to device 212 independently.

Figure 4:
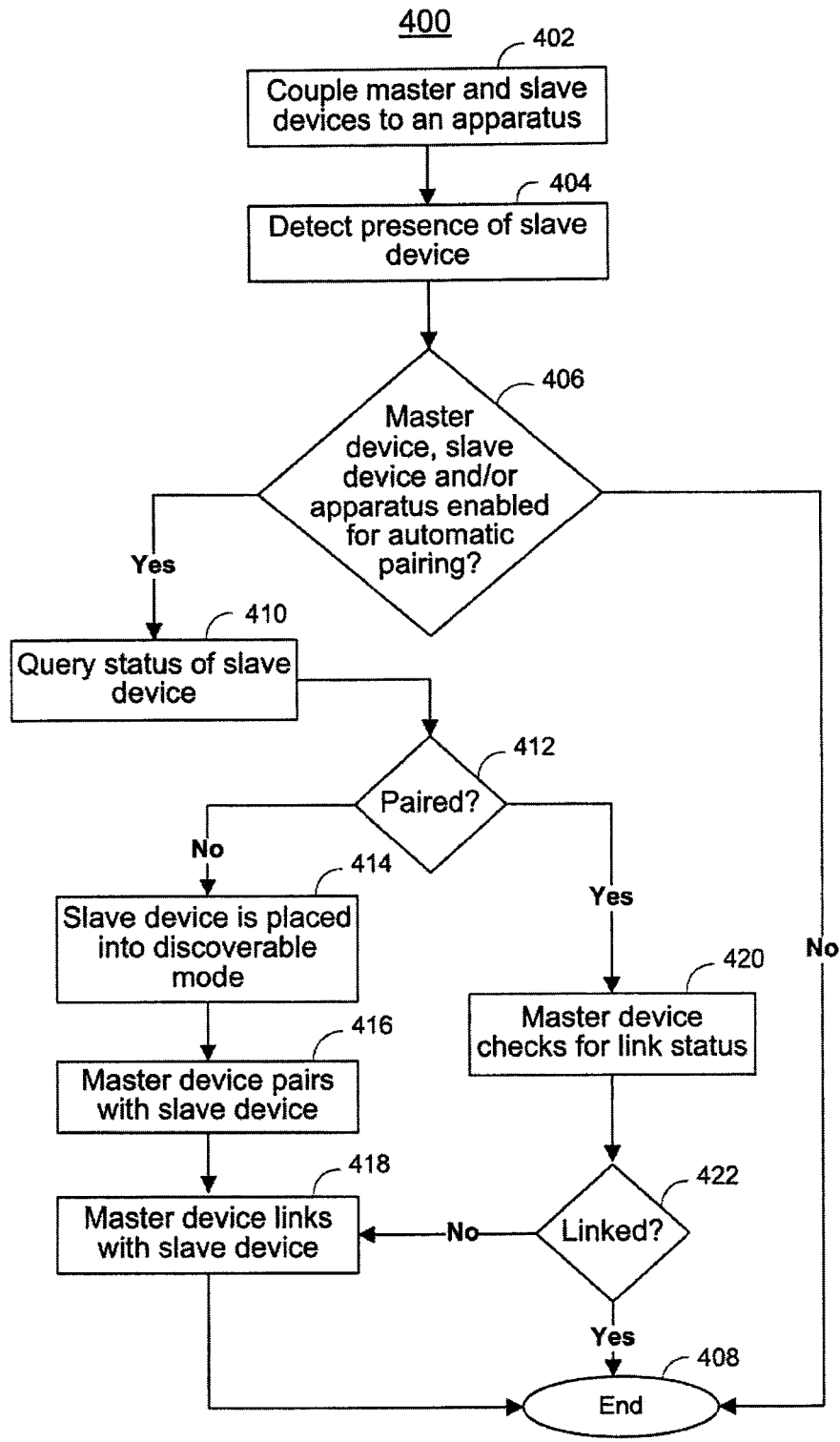
FIG. 4 shows a simplified flow chart of an illustrative mode of operation of circuitry of the type shown in FIGS. 2 and 3.

Further to the automatic Bluetooth pairing discussion above, FIG. 4 shows process 400. Process 400 is an illustrative mode of operation that can be partially or entirely performed by the circuitry of an apparatus (such apparatus 200 or 300 shown in FIGS. 2 and 3, respectively) to automatically pair two devices together in accordance with a Bluetooth protocol. As such, the circuitry of the apparatus can act as a pairing manager, which is discussed in more detail in commonly assigned U.S. patent application Ser. No. 11/513,692, filed Aug. 30, 2006, entitled "Pairing of Wireless Devices Using a Wired Medium" (hereinafter "the '692 application"), which is hereby incorporated by reference in its entirety.

Process 400 begins at step 402. In step 402, two devices, a master device and a slave device, can be electrically coupled to an apparatus. The apparatus can be similar to or the same as, for example, apparatus 200 or 300 described above. The master device (which is sometimes referred to as a host device) can be, for example, a cellular telephone, computer, or any other device that satisfies the Bluetooth specification's definition of a master device (i.e., controlling the traffic on a piconet physical channel by a polling scheme). The slave device (which is sometimes referred to as a client device) can be, for example, a wireless headset (such as those described above) or any other device that satisfies the Bluetooth specification's definition of a slave device.

In response to the master and slave devices being electrically and/or physically coupled to the apparatus, the microcontroller of the apparatus (e.g., microcontroller 214) may perform any function, including the functions discussed herein. The microcontroller of the apparatus can, for example, identify each device, authenticate each device, establish a communications path between the devices, place a device in a high power mode, reset the ports of a device, charge the battery of at least one of the devices (e.g., transfer power from the master device to the slave device), etc.

At step 404, the master device detects the presence of the slave device. In some embodiments, the circuitry in the apparatus is used by the master device to detect the slave device. For example, the microcontroller of the apparatus can provide the master device information about the slave device (e.g., the identity of the slave device, the fact that the slave device is electrically coupled to the apparatus, etc.). In alternative embodiments, the master device can detect the slave device without the assistance of the apparatus (e.g., wirelessly).

At step 406, a determination is made as to whether or not the master device is enabled for automatic pairing. In other words, the automatic pairing method of process 400 can be conditional on whether or not, e.g., a master device, the slave device and/or the apparatus is/are enabled for automatic pairing. Any device or apparatus can be manually or automatically disabled for automatic pairing due to various reasons. For example, some devices cannot automatically pair because they are not, e.g., a Bluetooth compliant device or are not compatible with the other device.

As another example, some master devices and/or slave devices cannot automatically pair when they are actively linked with another device. For example, while a telephone is coupled to the apparatus and is being charged or updated, the telephone can also have an active link with a first Bluetooth headset (i.e., when the user is talking on the telephone using the first Bluetooth headset), which can disable the telephone from being automatically paired with a second Bluetooth headset. So, even when the second Bluetooth headset is electrically coupled to the master device and is detected by the master device, automatic pairing will not occur and process 400 will end when the master device is linked to another device. In some embodiments, when the active link between the master device and the first device is terminated, the telephone can be enabled for automatic pairing with the device it is electrically coupled to via the apparatus. In other embodiments, the master device can remain disabled until the telephone and/or second Bluetooth headset is removed and reinserted into the apparatus.

As yet another example, a master and/or slave device can have a setting, which can be user or system programmed, that may conflict with part of the pairing process. For example, when the pairing process requires that wireless communications occur, an airplane mode setting would conflict with and may take priority over the pairing process (for safety and other reasons). It is understood that other settings that conflict with the automatic pairing process can have a lower priority than the automatic pairing process and thus would not prevent automatic pairing.

When it is determined that automatic Bluetooth pairing cannot take place because one or more of the devices and/or apparatus are not enabled for automatic Bluetooth pairing, process 400 advances to step 408 and ends. However, process can begin again (e.g., automatically or in response to a user input) at step 402 when, for example, the master device, slave device and apparatus become enabled for automatic pairing (e.g., when the conflicting setting is no longer conflicting or when the active link is terminated).

Process 400 advances to step 410 in response to determining that the master device, slave device and/or apparatus are enabled for automatic pairing. At step 410, the master device queries the status of the slave device. The master device can use the circuitry of the apparatus to query the status of the slave device. In alternative embodiments, the master device can query the slave device without using the circuitry of the apparatus (e.g., wirelessly).

In step 412, a determination is made as to whether or not the slave device is already paired to the master device. When the master and slave devices are not currently paired together, the process advances to step 414.

In step 414, the master device puts the slave device into a discoverable mode. The master device can use the circuitry of the apparatus to place the slave device in the discoverable mode. For example, the master device can request that the microcontroller of the apparatus place the slave device in the discoverable mode. In some embodiments, the master device can place the slave device in a discoverable mode without using the circuitry of the apparatus (e.g., wirelessly). In alternative embodiments (not pictured), the master device does not or cannot put the slave device in the discoverable mode, but rather relies on the microcontroller of the apparatus to automatically put the slave device in the discoverable mode.

In step 416, the master and slave devices can pair with each other in accordance with a Bluetooth protocol. In some other embodiments, the circuitry of the apparatus facilitates a portion of the pairing process and allows the other portion of the pairing process to take place outside the apparatus. For example, the apparatus may determine the Bluetooth pin of the slave device, provide the Bluetooth pin to the master device, and then allow the master device and slave device to pair together wirelessly. As another example, the master device begins the pairing process outside the apparatus (e.g., by determining the Bluetooth pin of the slave device) and then completes the pairing process using the internal circuitry of the apparatus. Using a wired connection in combination with a wireless connection to pair two devices together are discussed in more detail in the '692 application. One skilled in the art would appreciate that settings, such as airplane mode, may only conflict with automatic Bluetooth pairing when the pairing process utilizes a wireless connection.

In some embodiments, the apparatus of the present invention can dynamically choose how to facilitate the automatic Bluetooth pairing of two devices based on potential conflict settings. For example, when the master device is in airplane mode, the apparatus can choose to automatically pair the master device with a slave device using only wired connections (which may be internal or external to the apparatus).

The apparatus or master device may determine the Bluetooth pin of the slave device. The Bluetooth pin of the slave device can be determined by, for example, trial and error (e.g., trying different Bluetooth pins until the correct pin is determined by selecting a first Bluetooth pin; providing the first Bluetooth pin to the second device; receiving an indication from the second device as to whether the first Bluetooth pin is the same as the Bluetooth pin of the first device; in response to the second device indicating that the first Bluetooth pin is different from the Bluetooth pin of the first device, repeating the steps again with another Bluetooth pin until the correct Bluetooth pin for the slave device is determined). The Bluetooth pin of the slave device can also be determined by, for example, receiving the Bluetooth pin from the slave device via a hard-wired communications path (i.e., the slave device provides its Bluetooth pin to another device or apparatus after a hard-wired communications path is established), or any other method or combination of methods apparent to one skilled in the art.

In alternative embodiments, the entire pairing process of step 416 takes place outside the apparatus (e.g., wirelessly between the master and slave devices). In other alternative embodiments, the entire pairing process is facilitated by the circuitry of the apparatus. Whether the pairing process takes place outside of the apparatus can effect the determination made at step 404 in connection with whether or not the master device is enabled for pairing. For example, when the pairing process (which could be automatic or conventional) requires the use of wireless communications, the master device will be unable to pair with the slave device when the master device is in airplane mode. Because when the master device is in airplane mode, all of the wireless communications of the master device are disabled by definition.

After the master and slave devices are paired together in step 416, the master device links with the slave device in step 418. Once an authorized link is established, process 400 ends at step 406.

Returning to step 412, when the master device is already paired with the slave device, the process advances to step 420. In step 420, the master device checks its link status with respect to the slave device. In alternative embodiments, the microcontroller of the apparatus checks the link status between the master and slave devices. A determination is made in step 422 as to whether or not the master device is linked with the slave device. When the master device and/or the apparatus determines that the master device is already linked to the slave device, process 400 proceeds to step 406 and ends.

When the master device and/or the apparatus determines that the master device is not already linked to the slave device, process 400 proceeds to step 418. In step 418, the master device links with the slave device and then the process ends at step 406.

One skilled in the art would appreciate that any of the steps of process 400 can require a user interaction before proceeding. For example, before the two devices are paired together in step 416, the master device may prompt the user to accept or decline the master device being paired with the slave device.

The foregoing discussion of automatic Bluetooth pairing is not meant to be an exhaustive discussion. For a more detailed explanation of automatic Bluetooth pairing, please see U.S. patent application Ser. No. 11/513,616, filed Aug. 30, 2006, entitled "Automated Pairing of Wireless Accessories with Host Devices", which is hereby incorporated by reference in its entirety.

Figure 5A:
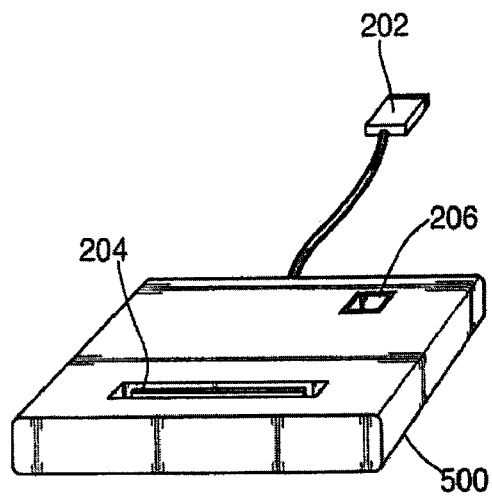
FIGS. 5-7 show illustrative systems that incorporate the present invention.
Figure 5B:
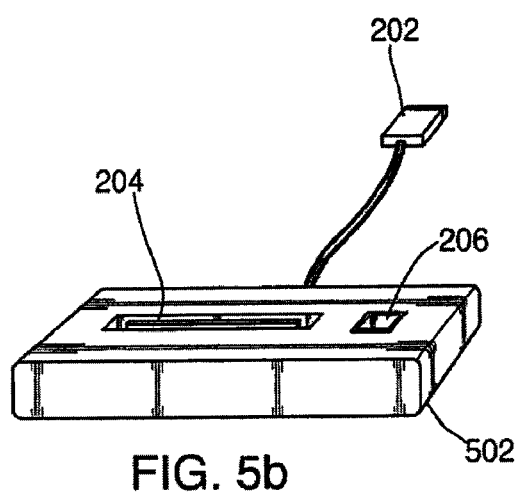

FIGS. 5a and 5b show illustrative examples of docking devices 500 and 502, respectively. Docking devices 500 and 502 are electrical devices in which the circuitry discussed above in connection with FIG. 2 FIG. 3 or a combination therefrom is implemented. Docking devices 500 and 502 are similar to docking station 100 shown in FIG. 1. Docking devices 500 and 502 include ports 202, 204 and 206, which are similar or the same as ports 202, 204 and 206 discussed above in connection with FIGS. 1-3.

Docking devices 500 and 502 are electrical devices in which the circuitry discussed above in connection with FIG. 2 or 3 is implemented. Devices (which are not shown in FIGS. 5a and 5b that are similar to or the same as the devices described above in connection with FIGS. 1 and 2) can be coupled to ports 202, 204 and 206 of docking devices 500 and 502. Docking devices 500 and 502 can then be used as described above and facilitate the transfer of power and information among electrical devices.

Figure 6A:
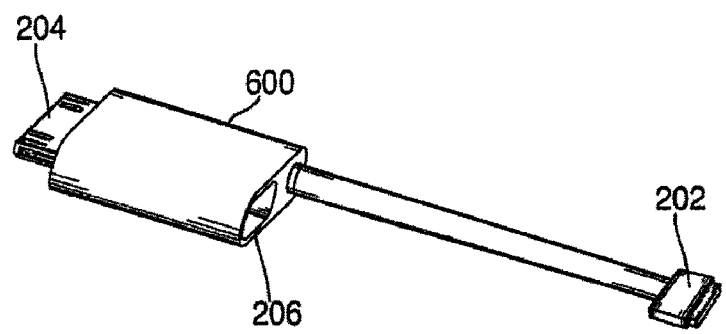
Figure 6B:
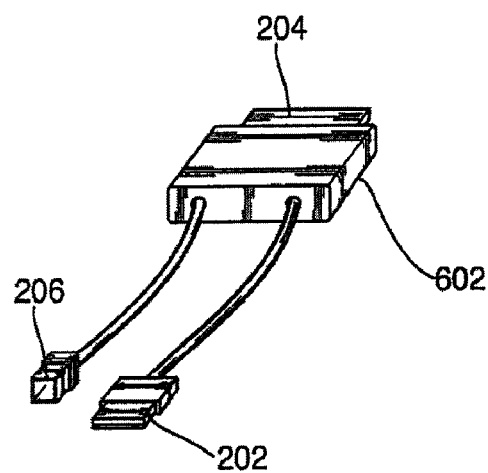
Figure 6C:
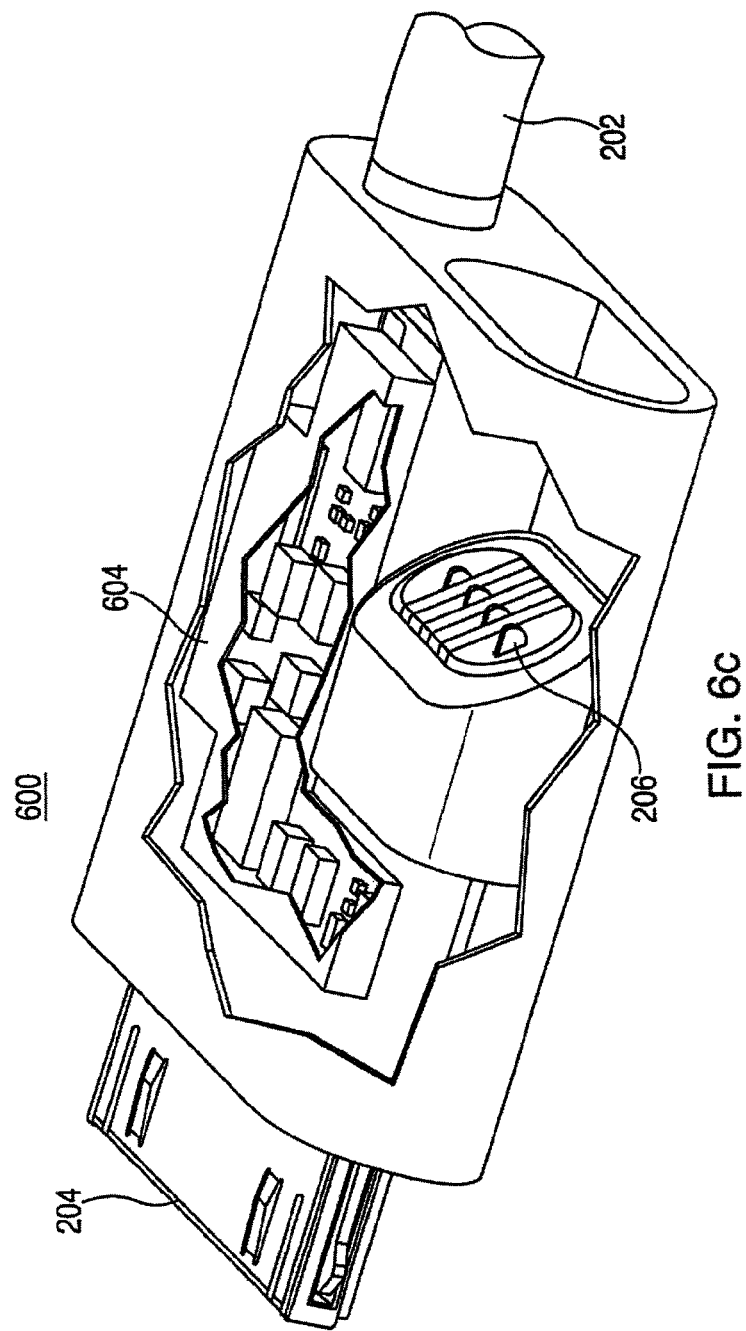

FIGS. 6a and 6b show illustrative examples of cables 600 and 602, respectively. Cables 600 and 602 are portable electrical devices in which the circuitry discussed above in connection with FIG. 2, FIG. 3 or a combination there from is implemented. Cables 600 and 602 include ports 202, 204 and 206, which are similar or the same as ports 202, 204 and 206 discussed above in connection with FIGS. 1-4.

FIG. 6c shows a cut away view of cable 600, which is shown in FIG. 6a. As such, ports 202, 204 and 206 are the same ports shown in FIG. 6a. Port 202 illustrates an example of the male 30-pin connector discussed above and port 206 illustrates an example of the symmetrical four pin connector discussed above (as well as in the P4672P1 Application, the P4672P2 Application and the P4672P3 Application). Circuitry 604 is located inside of cable 600 and may include components such as, for example, one or more microcontrollers, switches, regulators, and/or boost circuits, any of which can be the same as or substantially similar to the components discussed above. For example, circuitry 604 may include a Sipex regulator, a TI MSP V126, a Seiko Boost circuit, an Intersil USB switch, and various other electrical components.

Devices (not shown in FIG. 6a or 6b that similar to or the same as the devices described above in connection with FIGS. 1 and 2) can be coupled to cables 600 and 602 via ports 202, 204 and 206. Cables 600 and 602 can then be used as described above and facilitate the transfer of power and information among the devices.

Figure 7A:
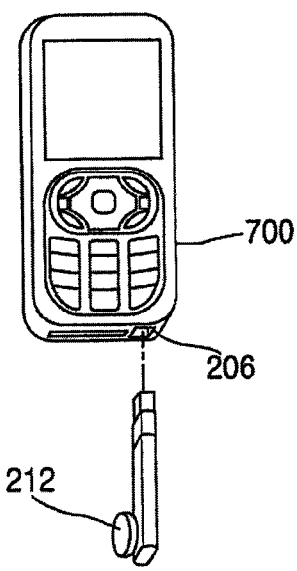
Figure 7B:
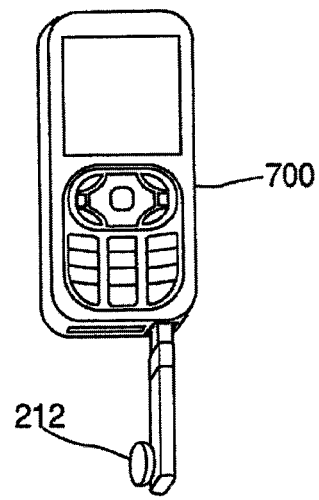

FIGS. 7a and 7b show illustrative examples of cellular telephone 700 before and after cellular telephone 700 is physically coupled with device 212. Device 212 is coupled to cellular telephone 700 via port 206. Port 206 is similar or the same as port 206 described above in connection with FIG. 2. Device 212 can be similar to or the same as device 212 discussed above in connection with FIG. 2. As mentioned above, device 212 can be, for example, a wireless Bluetooth headset.

Circuitry that is in accordance with the principles of the present invention may be implemented in a device, such as cellular telephone 700. The circuitry in cellular telephone 700 can be used, as described above, to facilitate the transfer of power and/or information between cellular telephone 700 and device 212. For example, power from the battery of cellular telephone 700 can be used to charge the battery of device 212. As another example, in response to device 212 being inserted into port 206, the circuitry may facilitate the automatic pairing (as discussed above) of cellular telephone 700 and device 212.

One skilled in the art would appreciate that the circuitry discussed above may be included in any other electrical device (such as, e.g., an iPod, computer, accessory device, etc.). The circuitry described above can also be implemented in any other object that can be in proximity to and/or used with a fixed, portable or mobile power source (e.g., desk, automobile dashboard, airplane seat, wall power outlet, etc.).

FIGS. 8-22 are flow charts that illustrate some of the various methods that can be used to facilitate the exchange of information and/or power among two or more devices in accordance with the principles of the present invention. FIGS. 8-11 and 16-19 are flow charts that illustrate two different embodiments of methods that include steps that can occur when one or more devices are coupled to an apparatus. FIGS. 12-15 and 20-22 are flow charts that illustrate two different embodiments of methods that include steps that can occur when one or more devices are decoupled from an apparatus. One skilled in the art would understand that methods similar to or the same as the methods described herein can also be used in the absence of the apparatuses described herein. One skilled in the art would also appreciate that various steps from various methods can be combined with each other and with steps not specifically discussed or illustrated herein.

Figure 8:
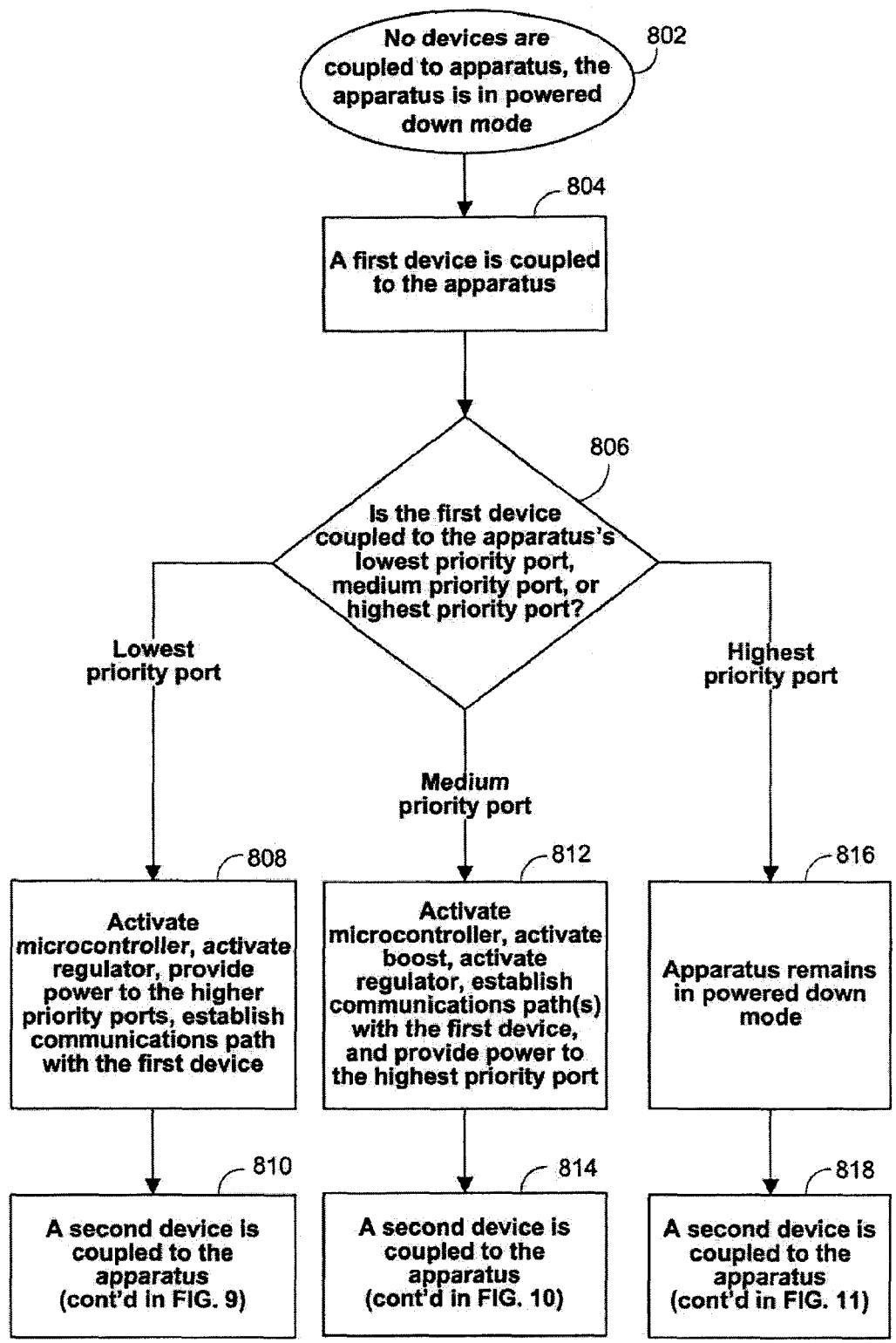
FIGS. 8-22 show simplified flow charts of illustrative modes of operation of circuitry of the type shown in FIG. 2.
Figure 9:
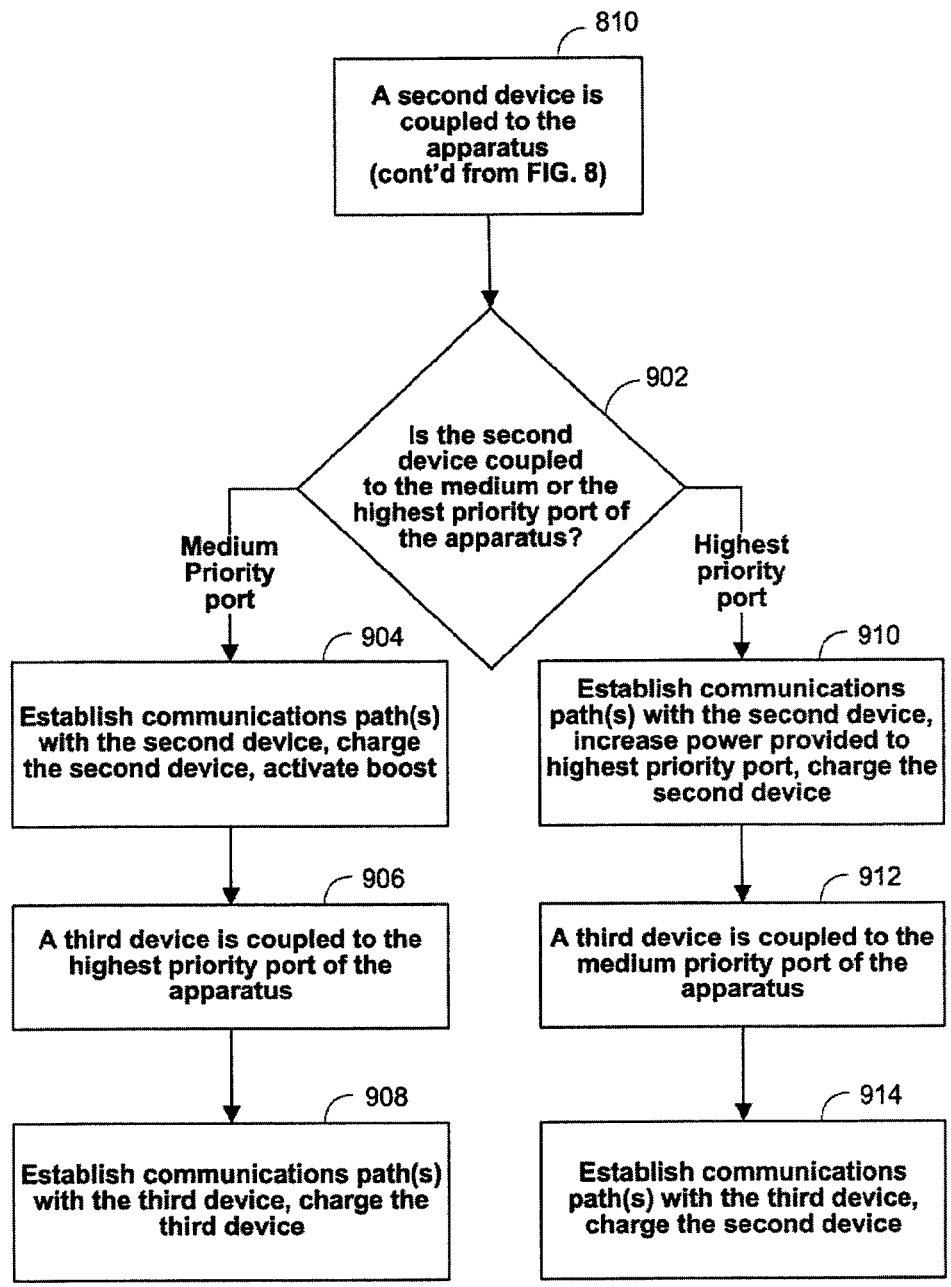

Turning to FIG. 8, the process begins at step 802 when there are no devices coupled to an apparatus (e.g., apparatus 200 shown in FIG. 2 or apparatus 300 shown in FIG. 3). The apparatus is preferably in a powered down mode. In the powered down mode, the components of the apparatus (e.g., port 202, port 204, port 206, microcontroller 214, boost 236, regulator 238, wireless emitter/receiver, etc.) are preferably not receiving power and are not functioning. In alternative embodiments, the apparatus can have its own power source (e.g., a battery, capacitor, etc.) (not shown), which allows any component of the apparatus to function when there are no devices coupled to the apparatus.

One skilled in the art would appreciate that the process can begin at a step other than step 802. For example, the process can begin at step 808 (which is discussed below) when the process begins with a device already coupled to the medium priority port or when the apparatus is integrated into a medium priority device (such as, e.g., an iPod or cellular telephone 700 shown in FIGS. 7a and 7b).

At step 804, a first device is coupled to the apparatus. Further to the priority discussion above in reference to FIG. 2, the processes discussed herein are based on an apparatus in which the ports of the apparatus are prioritized. Step 806 illustrates that the direction of the process can be determined in response to whether the first device is coupled to the lowest priority port (e.g., port 202), the medium priority port (e.g., port 204), or the highest priority port (e.g., port 206). The step that occurs next in the process is based on which port the first device is coupled to.

When the first device is coupled to the lowest priority port, the process moves from step 806 to step 808. In some embodiments, at step 808, a microcontroller (e.g., microcontroller 214) and a regulator (e.g., regulator 238) of the apparatus are activated (i.e., powered ON) with power that is provided by or taken from the first device. In step 808, the apparatus also facilitates the transfer of power among the ports of the apparatus. For example, power (e.g., V1) from the first device (e.g., device 208) can be provided to the medium priority port (via, e.g., line 230 as shown in FIG. 2) and to the highest priority port (via, e.g., a power switch, such as switch 220, and the regulator, thereby allowing less power, e.g., V2, to the highest priority port). In step 808, the apparatus can also prepare to facilitate the transfer of information between the first device and another device (that is not yet connected) by creating an information path between the lowest priority port device and another port. For example, the information switch (e.g., switch 220) can couple the highest priority port with the medium priority port (by, e.g., coupling input 222 to output 226 as shown in FIG. 2). In some embodiments the microcontroller can communicate (as discussed above in reference to FIG. 2) with the first device in step 808.

In alternative embodiments (such as, for example, the embodiment illustrated in FIG. 3), both power and information lines of the lowest priority port can be coupled to one or more of the higher priority ports (e.g., via switch 302) at step 808.

At step 810 a second device is coupled to the apparatus. The process continues in FIG. 8 at step 902, which illustrates that the direction of the process can be determined in response to which port the second device is coupled to.

When the second device is coupled to the medium priority port, step 902 is followed by step 904. In step 904, the apparatus can, for example, facilitate communications (e.g., USB communications) between the first and second devices and/or communicate directly with the second device. As described above in reference to FIG. 2, the microcontroller can establish a communications path between a device and the microcontroller and/or another device. The communications path can then be used to, for example, request a particular amount of power (at a particular current and/or voltage), etc. In step 904, the apparatus can also facilitate the charging of the second device with power from the first device (which, in some embodiments, was provided to the medium priority port in step 908), activate the boost (e.g., boost 236, in anticipation of a third device being coupled to the highest priority port or the first device being decoupled from the lowest priority port), and regulate the output of the boost (which can, for example, maintain the voltage provided to the highest priority port at, e.g., V2 when the first device is decoupled from the apparatus).

In step 906, a third device is coupled to the highest priority port of the apparatus. In response to a third device (e.g., device 212) being coupled to the apparatus, the process continues to step 908.

In step 908, the microcontroller preferably creates a communications path to the third device and communicates with the third device (e.g., using a serial communication protocol). The apparatus can also allow the second device to communicate with the third device (directly or indirectly as discussed above in reference to FIG. 2).

The voltage, that is provided to the highest priority port prior to the third device being coupled to the apparatus, can indicate to the third device which standard and/or protocol the third device should use to communicate with the apparatus and/or other device(s) in step 908. The apparatus and/or the other device, which is communicating with the third device, can, for example, identify the third device, authenticate the third device, and/or perform any other necessary action required to communicate with the third device (e.g., reset the ports of the third device), handshake with the third device, negotiate the charge with the third device (i.e., communicate how much power should be provided to the third device), and/or exchange any other information (including instructions) with the third device). In response to establishing a communications path and/or exchange of communications with the third device, the apparatus can allow more power to be provided to the third device (by, e.g., deregulating the power provided to the regulator). Allowing more power (i.e., more voltage (e.g., V3) and/or current) to be provided to the third device can cause the third device to be charged more rapidly.

Returning to step 902, the second device to be coupled to the apparatus can be coupled to the highest priority port. When the second device is coupled to the highest priority port, step 910 comes after step 902 in the process.

In step 910, the microcontroller can establish a communications path that allows the microcontroller to communicate with the second device (using, e.g., a USB protocol, a different serial communications protocol, or any other communications protocol). In some embodiments, the apparatus can establish a communications path that allows the first device to communicate with the second device (e.g., device 212) directly or indirectly (as discussed above in reference to FIG. 2).

As described above in reference to step 908, the voltage, that is present at the highest priority port when the second device is initially coupled to that port, can indicate to the second device which standard and/or protocol the second device should use to communicate with the microcontroller or first device in step 910. After the microcontroller and/or the first device communicates with the second device, the power to the highest priority port can be (completely or partially) deregulated by the microcontroller, thereby allowing the second device to be charged more rapidly.

In step 912, a third device is coupled to the medium priority port of the apparatus. Step 914 occurs in response to the third device (e.g., device 210) being coupled to the medium priority port, the microcontroller can temporarily interrupt or slow down the charging of the second device by, for example, regulating the power provided to the second device, updating the communications path(s) to the second device, or instructing the second device to reset its ports.

Step 914 can also include establishing a communications path between the third device and the microcontroller and/or other device(s), discontinuing the communications between the first device and the second device (this can occur when, e.g., switch 220 decouples input 222 from output 224), and facilitating communications between the first device and the third device (by, e.g., using switch 220 to couple input 222 to output 226). In communicating with the third device, microcontroller and/or one of the other devices can, for example, negotiate the charge of the third device (e.g., determine whether the third device needs to be charged, the amount of power that the third device should receive and/or provide, etc.). In response to the negotiations with the third device, the apparatus can facilitate the transfer of power to and/or from the third device. In step 914, communications between the apparatus's microcontroller and the second device can resume (which can include any exchange of information and/or instructions) and the second device can continue to be charged with power from the first and/or third device coupled to the apparatus.

Returning to step 806, the first device coupled to the apparatus can be coupled to the medium priority port of the apparatus. When the first device (e.g., device 210) is coupled to the medium priority port, step 806 is followed by step 812.

In response to the first device being coupled to the medium priority port, the microcontroller, the boost, and the regulator can be activated in step 812. The microcontroller can also establish a communications path with the first device and negotiate the power exchange particulars with the first device (e.g., the amount of voltage and current that the first device will provide to and receive from other devices, etc.).

As a result of the microcontroller's communications with the first device, the first device can output power (e.g., V2 at a given current) to the boost. The boost can then increase the power (to, e.g., V3) and provide the power (e.g., V3 at the given current) to the regulator. The regulator can regulate the power (to, e.g., V2) and then provide the power (e.g., V2 at a given current) to the highest priority port in anticipation of a device being coupled to the highest priority port.

In step 814, a second device is coupled to the apparatus. The process is continued in FIG. 9 at step 1002. Step 1002 illustrates that the direction of the process can be determined based on which port the second device is coupled to.

When the second device is coupled to the lowest priority port, step 1002 is followed by step 1004 in the process. In step 1004, the microcontroller can, for example, establish one or more communications paths with the first device, facilitate communications (e.g., USB communications) between the first and second devices and/or communicate directly with the second device (which can include, for example, negotiating the power transfer from the second device). Step 1004 can also include charging the first device with the power from the second device (via, e.g., line 236 shown in FIG. 2 or switch 302 shown in FIG. 3).

In step 1006, a third device is coupled to the highest priority port of the apparatus. In response to a third device (e.g., device 212) being coupled to the apparatus, the process proceeds to step 1008.

In step 1008, the microcontroller establishes one or more communications paths with the third device, facilitates communications between the third device and the microcontroller and/or the other devices (including, e.g., negotiating the power transfer to the third device). As described above, the power (e.g., V3 at a given current), that was being provided to the highest priority port when the third device was coupled to the highest priority port, can indicate to the third device which communications protocol and/or standard should be used to communicate with the microcontroller and/or the other devices. The microcontroller can then increase the power provided to the highest priority port (to, e.g., V3 at a given current) by, for example, deregulating (completely or partially) the power from the boost, and facilitate the rapid charge of the third device.

Returning to step 1002, when the second device coupled to the apparatus is coupled to the highest priority port, step 1010 is after step 1002 in the process.

In step 1010 the microcontroller can establish a communications path(s) with the second device and facilitate communications with the second device. As described above, the microcontroller can deregulate the power provided to the highest priority port after communicating with the second device and begin a more rapid charge of the second device with power provided by the first device.

In step 1012, a third device is coupled to the lowest priority port of the apparatus and, in response, the process proceeds to step 1014.

In step 1014, the microcontroller can establish one or more communications paths to the third device, facilitate communications between the third device and the first device (via, e.g., a switch such as, for example, switch 220 of FIG. 2 or switch 302 of FIG. 3) and/or the microcontroller. The apparatus can also facilitate the charge of the second device (via, e.g., a hard wired connection like line 230 of FIG. 2 or a switch like switch 302 of FIG. 3).

Returning to step 806 of FIG. 8, the first device coupled to the apparatus can be coupled to the highest priority port of the apparatus. When the first device (e.g., device 212) is coupled to the highest priority port, the process flows from step 806 to step 816.

In some embodiments, the apparatus remains in the powered down mode (which was discussed above in reference to step 802) when the first device is coupled to the highest priority port. By leaving the apparatus in the powered down mode, the first device is not drained of any power. This approach is one example of a method that assures the device coupled to the highest priority port will only receive power and will not provide power to the apparatus or any other device.

One skilled in the would appreciate that in alternative embodiments, the device coupled to the highest priority port can provide power to the apparatus and/or any other device based on, for example, the amount of excess power that the device coupled to the highest priority port can spare, the need to communicate with the apparatus, or for any other reason. In such alternative embodiments, the microcontroller can only request power from the device coupled to the highest priority port until, for example, a second device is coupled to a lower priority port, until the first device has no or a certain amount of excess power, until a given amount of time elapses, until the microcontroller finishes communicating (e.g., identify, authenticate, reset, etc.) with the device coupled to the highest priority port, or until any other event occurs.

Figure 10:
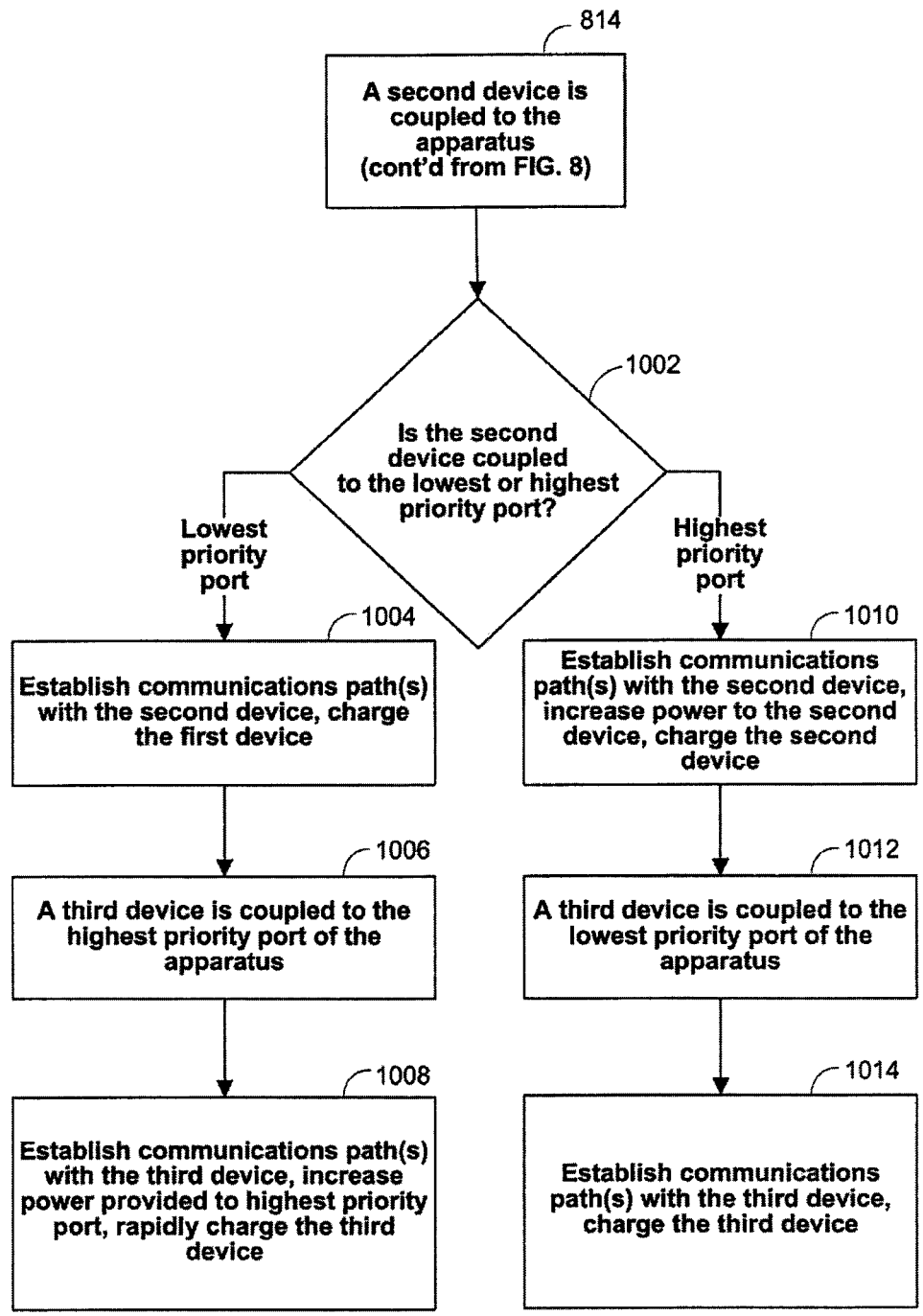
Figure 11:
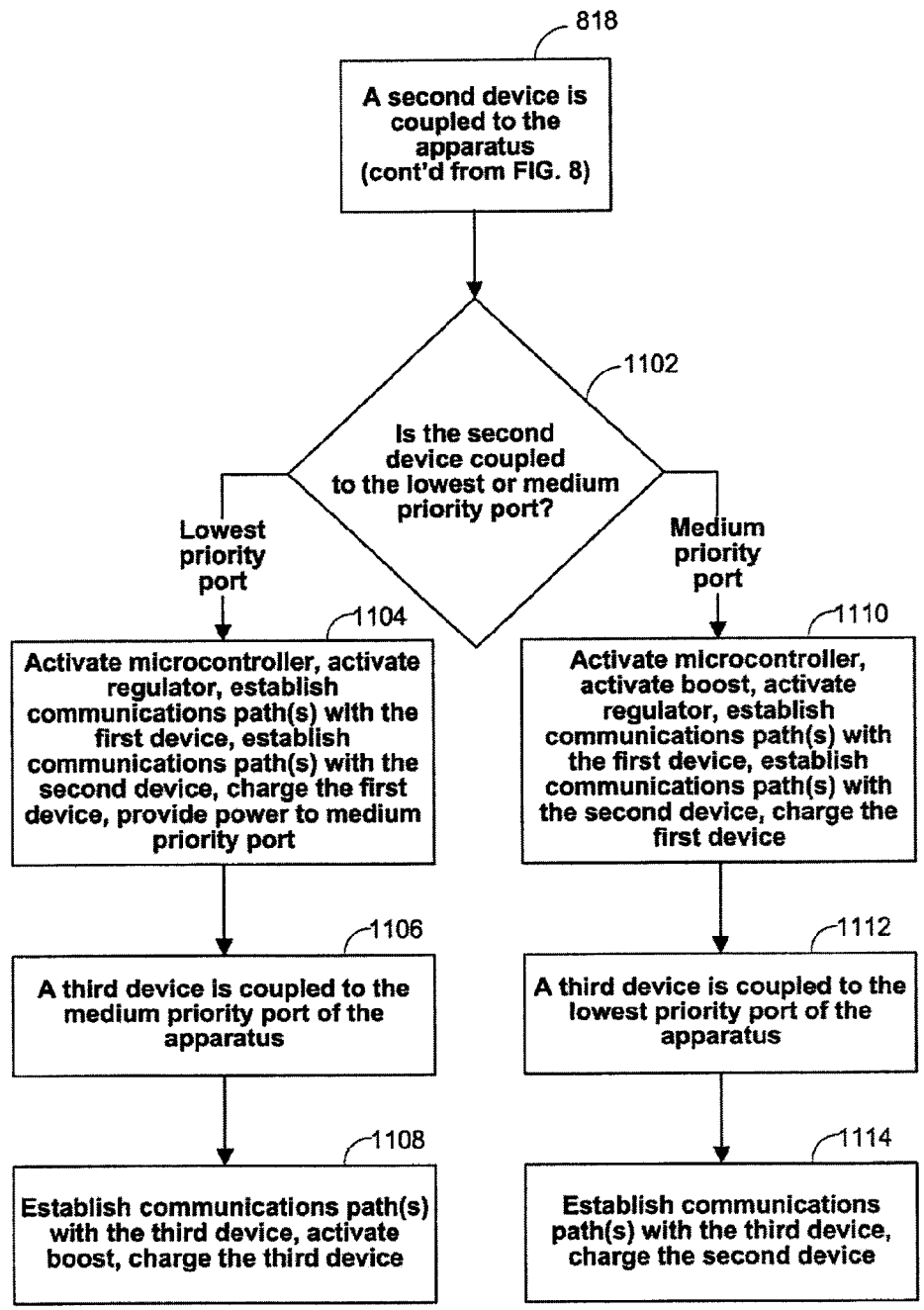

In step 818, a second device is coupled to the apparatus and the process continues in FIG. 10. Step 1102 of FIG. 11 illustrates that the direction of the process can be determined based on which port the second device is coupled to. The process proceeds to step 1104 in response to the second device being coupled to the lowest priority port.

In some embodiments, the microcontroller and the regulator are activated at step 1104 of the process. In some embodiments, the microcontroller establishes a communications path between the first device and microcontroller and/or the second device. The microcontroller can also establish a communications path between the second device and the microcontroller. After the communications path(s) are established, the microcontroller can then facilitate communications (direct or indirect) among the devices and/or itself (via, e.g., switch 220 and/or line 218 illustrated in FIG. 2). The microcontroller can also facilitate the transfer of power from the second device to the first device in step 1104 (via, e.g., switch 220 illustrated in FIG. 2 or switch 302 illustrated in FIG. 3), thereby charging the first device with power from the second device. In some embodiments, the microcontroller can provide power to the medium priority port (e.g., via line 230) in anticipation of a third device being coupled to the apparatus.

In step 1106 a third device is coupled to the medium priority port of the apparatus. In response to the third device being coupled to the medium priority port of the apparatus, the process proceeds to step 1108.

In step 1108 the boost is activated. The microcontroller can also establish a communications path between the third device and the microcontroller and/or one or more of the other devices. After the communications paths are established, the microcontroller can then facilitate communications with the third device. In some embodiments, the microcontroller communicates with the third device. In some embodiments, the microcontroller can allow the third device to communicate with the first and/or second device (directly or indirectly), which can require the microcontroller to discontinue and/or interrupt the communications between the first and second devices. For example, when the first device (i.e., device 212) is communicating directly with the second device (i.e., device 208) via a switch (e.g., switch 220 illustrated in FIG. 2 or switch 302 illustrated in FIG. 3), the microcontroller (e.g., microcontroller 214) can interrupt the direct communications between the first and second devices, facilitate the direct communications between the second and third devices (via, e.g., switch 220), and then facilitate indirect communications between the first and third devices (e.g., by using lines 216, 218, and 224 as shown in FIG. 2). Finally, in step 1108 the microcontroller facilitates the transfer of power from the second device to the third device and the third device receives a charge.

Returning to step 1102, when the second device coupled to the apparatus is coupled to the medium priority port, the process proceeds to step 1110 after step 1102.

In step 1110, the microcontroller, boost and regulator are activated. The microcontroller can then facilitate communications with itself and the second device and/or between the first and second devices (directly or indirectly) after establishing corresponding communications paths. In some embodiments, the microcontroller can also establish a communications path between itself and the first device and then facilitate communications between the microcontroller and the first device. In some embodiments, after communications have been established with the first device (and the microcontroller and/or the second device), the microcontroller can deregulate the power provided to the highest priority port and begin to charge the first device with power provided by the second device.

In step 1112, a third device is coupled to the lowest priority port of the apparatus and, in response, the process proceeds to step 1114.

In step 1114, the microcontroller can establish one or more communication paths and facilitate communications between the third device and the first and/or second device (via, e.g., a switch such as, for example, switch 220 of FIG. 2 or switch 302 of FIG. 3) and/or between the third device and the microcontroller. The apparatus can also facilitate the charging of the second device (via, e.g., a switch or a hard-wired connection) using power provided by the third device.

FIGS. 12-15 illustrate the steps that can occur when one or more devices are decoupled from an apparatus that was discussed herein in reference to the embodiment of the present invention (i.e., that similar to or the same as apparatus 200).

For the purpose of illustration, the process for removing devices begins at step 1202 with a device coupled to each of the three ports of the apparatus. One skilled in the art would appreciate that the process shown in FIGS. 12-15 can begin at a different step (i.e., other than step 1202), because the first device is decoupled from the apparatus when there is only one, two or more than three devices coupled to the apparatus.

In step 1202, the apparatus is facilitating the transfer of power and information among the device as described above. A first device is decoupled from the apparatus in step 1204. Step 1206 illustrates that the direction of the process can be determined in response to whether the first device is decoupled from the lowest priority port (e.g., port 202), the medium priority port (e.g., port 204), or the highest priority port (e.g., port 206) of the apparatus.

When the first device is decoupled from the lowest priority port, the process proceeds to step 1208 from step 1206. In some embodiments, at step 1208 the microcontroller (e.g., microcontroller 214) determines that the first device has been decoupled from the apparatus. The microcontroller can determine that a device is being (or has been) decoupled from the apparatus in response to, for example, the device sending a signal to the microcontroller (via, e.g., the lowest priority port or wirelessly) informing the microcontroller that the device is being (or was) decoupled, the microcontroller no longer receiving communications from the device that was decoupled, the microcontroller receiving an indication from a user that the device is being (or was) decoupled (e.g., an eject button), another device informing the microcontroller that the first device is no longer coupled to the apparatus (after, e.g., the device communicates to the other device that the device was decoupled, a charge is no longer being supplied to the other device from the device, etc.), or by any other means. One skilled in the art would understand that this determination can take place regardless as to which port a device is decoupled from or when the device is decoupled (i.e., the first, second or third).

In response to the microcontroller recognizing that the first device was decoupled from the lowest priority port, the power provided from the lowest priority port to the higher priority ports is discontinued, thereby preventing the device coupled to the medium priority port from being charged, and the microcontroller ceases to facilitate all communications to and from the lowest priority port.

Figure 12:
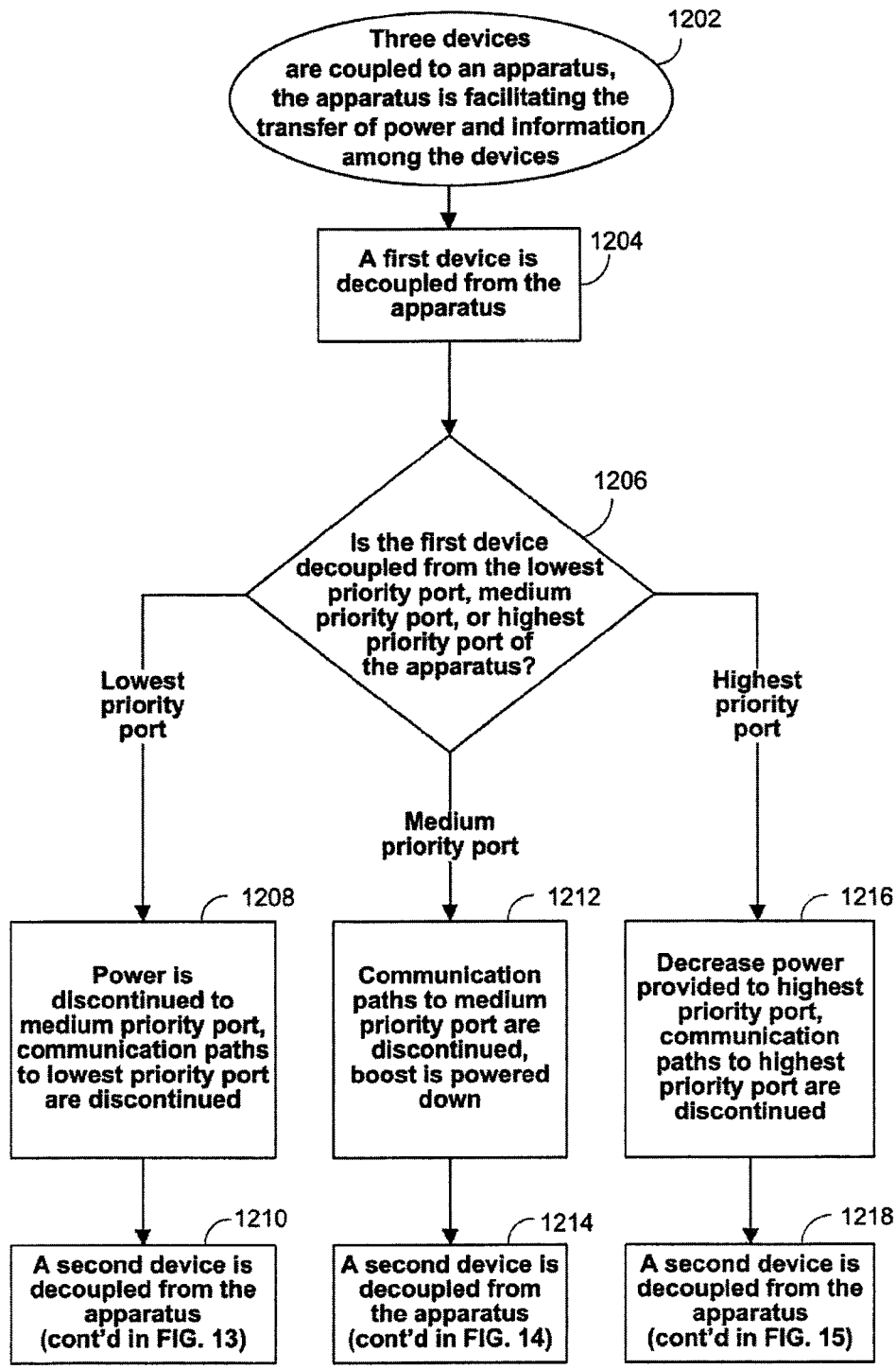

At step 1210, a second device is decoupled from the apparatus and the process continues in FIG. 12. Step 1302 illustrates that the direction of the process can be determined in response to which port the second device is decoupled from.

When the second device is decoupled from the medium priority port, step 1302 is followed by step 1304. In step 1304, the microcontroller can determine that the second device was decoupled from the medium priority port. In response to this determination, the microcontroller would recognize that the only device coupled to the apparatus is coupled to the highest priority port and, preferably, the microcontroller will power down all of the components of the apparatus (e.g., boost, regulator, microcontroller, etc.). This is referred to as the powered down mode. As discussed above, in reference to FIG. 6, the powered down mode can help prevent power from being taken from the device that is coupled to the highest priority port. Although, as noted above, in some alternative embodiments the apparatus can not automatically enter the powered down mode (e.g., when the apparatus includes a batter, etc.).

In step 1306, a third device is decoupled from the highest priority port of the apparatus and in step 1308 the apparatus remains in the powered down mode.

Returning to step 1302, the second device to be decoupled from the apparatus can be decoupled from the highest priority port. When the second device is decoupled from the highest priority port (e.g., port 206), the process proceeds to step 1310 after step 1302.

In step 1310, the microcontroller determines that the second device has been decoupled from the highest priority port and can cease all communications to highest priority port. The microcontroller can also decrease the power that is being provided to the highest priority port (by, e.g., regulating the power supplied by the boost) in anticipation of a device being re-coupled to the highest priority port (see, e.g., step 814 shown in FIG. 9).

In step 1312, a third device is decoupled from the lowest priority port of the apparatus. In response, the process moves onto step 1314 and the apparatus enters the powered down mode.

Returning to step 1206, the first device decoupled from the apparatus can be decoupled from the medium priority port of the apparatus. When the first device (e.g., device 210) is decoupled from the medium priority port, step 1206 is followed by step 1212.

In step 1212, the microcontroller can determine that there is no longer a device coupled to the medium priority port. In step 1212, in response to the determination, the microcontroller powers down the boost (e.g., boost 240) and discontinues communications to and from the medium priority port. For example, the information switch (e.g., switch 220 shown in FIG. 2) can be switched to couple the lowest priority port with the highest priority port.

Figure 13:
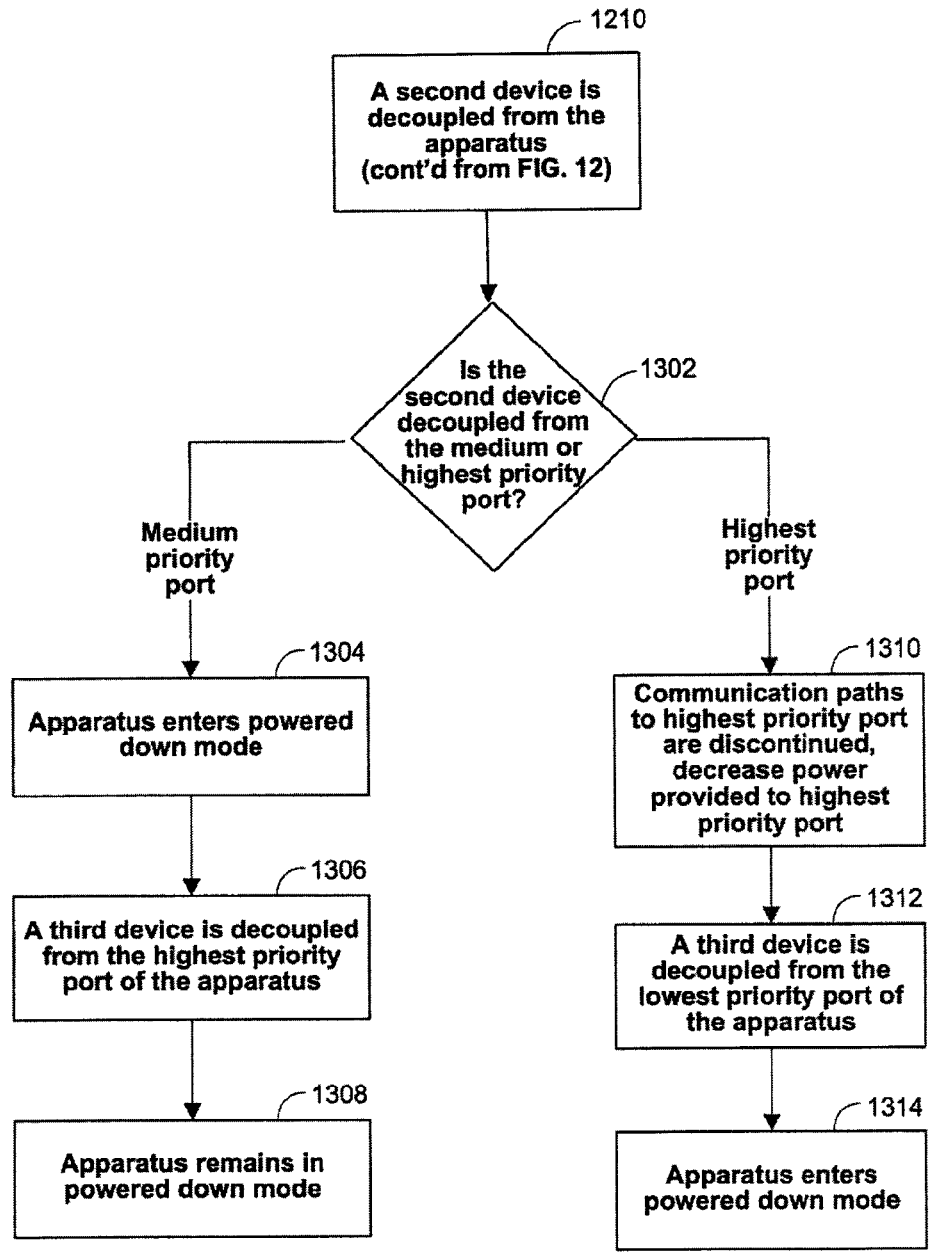

In step 1214, a second device is decoupled from the apparatus and the process advances to FIG. 13. Step 1402, which follows step 1214, illustrates that the next step of the process can be determined based on which port the second device is decoupled from.

When the second device is decoupled from the lowest priority port, the process proceeds to step 1404 in which the microcontroller determines that the only device coupled to the apparatus is coupled to highest priority port and the apparatus enters the powered down mode.

In step 1406, the third device is removed from the highest priority port of the apparatus. In step 1408, with no devices coupled to the apparatus, the apparatus remains in powered down mode.

Returning to step 1402, the second device that is decoupled from the apparatus can be the device coupled to the highest priority port and the process proceeds to step 1410. When the second device is decoupled from the highest priority port, the microcontroller determines that the only device coupled to the apparatus is coupled to lowest priority port. In step 1410, communications to the highest priority port are discontinued by the microcontroller. The microcontroller can also instruct the regulator to regulate the power provided to the highest priority port.

In step 1412, the third device is decoupled from the lowest priority port of the apparatus. In step 1414, with no devices coupled to the apparatus, the apparatus can remain in powered down mode.

Returning to step 1206, the first device decoupled from the apparatus can be decoupled from the highest priority port of the apparatus. When the first device (e.g., device 212) is decoupled from the highest priority port, step 1216 follows step 1206.

In response to the first device being decoupled from the highest priority port, the microcontroller can determine that there is no longer a device coupled to the highest priority port. In step 1216, communications to the highest priority port are discontinued. The microcontroller can also instruct the regulator to regulate the power provided to the highest priority port in step 1216.

Figure 14:
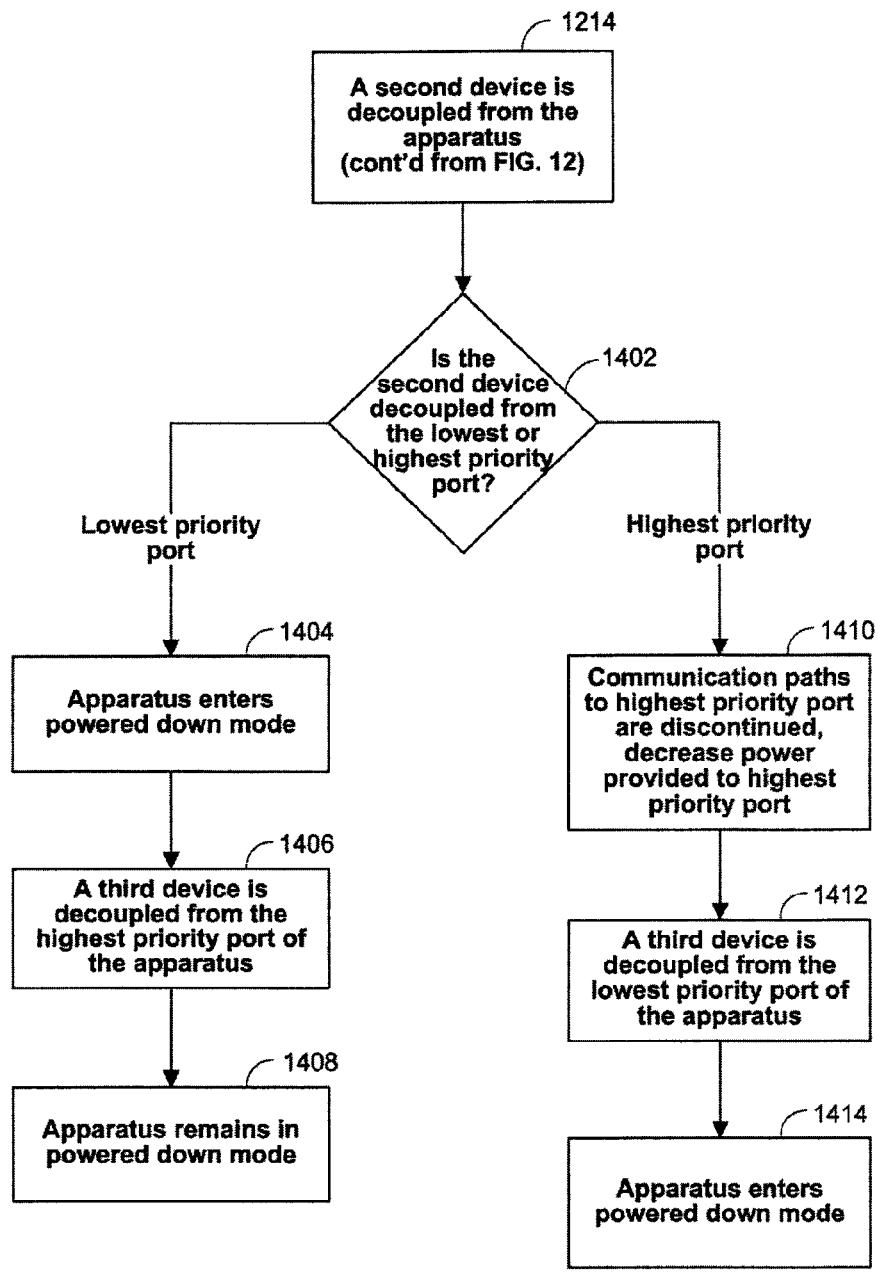
Figure 15:
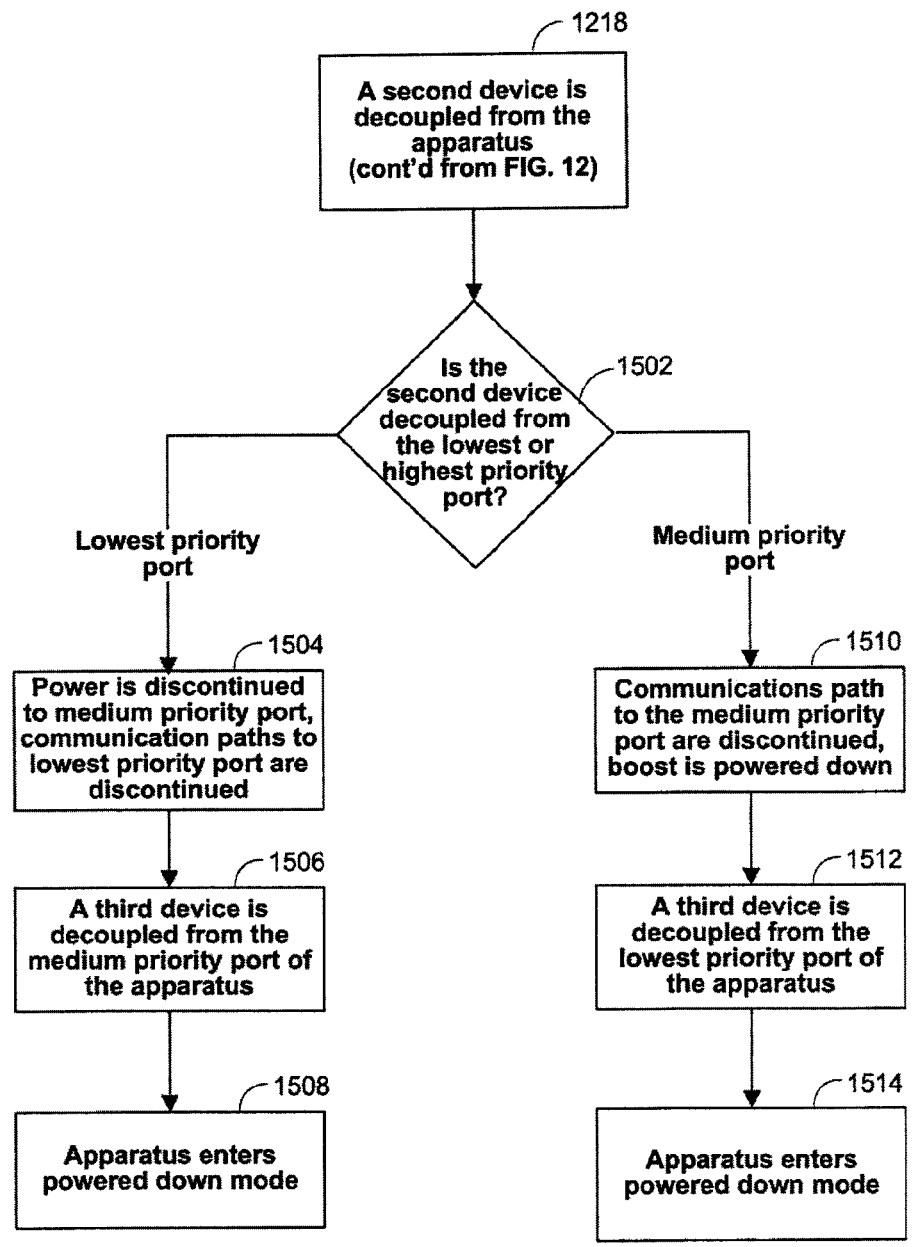

In step 1218, a second device is decoupled from the apparatus and the process advances to FIG. 14. Step 1502, which follows step 1218, illustrates that the next step of the process can be determined based on which port the second device is decoupled from.

When the second device is decoupled from the lowest priority port, the microcontroller can then determine that the only device coupled to the apparatus is coupled to medium priority port. In some embodiments, the process advances to step 1504. In step 1504, power is no longer provided to the medium priority port and the microcontroller discontinues the communications path(s) to the lowest priority port.

In step 1506, a third device is removed from the medium priority port of the apparatus. In step 1508, with no devices coupled to the apparatus, the apparatus remains in powered down mode.

Returning to step 1502, the second device that is decoupled from the apparatus can be the device coupled to the medium priority port. When the second device is decoupled from the medium priority port of the apparatus, the microcontroller determines that the only device still coupled to the apparatus is coupled to lowest priority port. In some embodiments, the process advances to step 1510.

In step 1510, communications to the medium priority port are discontinued. The microcontroller can also instruct the boost to power down.

In step 1512, the third device is decoupled from the lowest priority port of the apparatus. In step 1514, with no devices coupled to the apparatus, the apparatus can remain in powered down mode.

Figure 16:
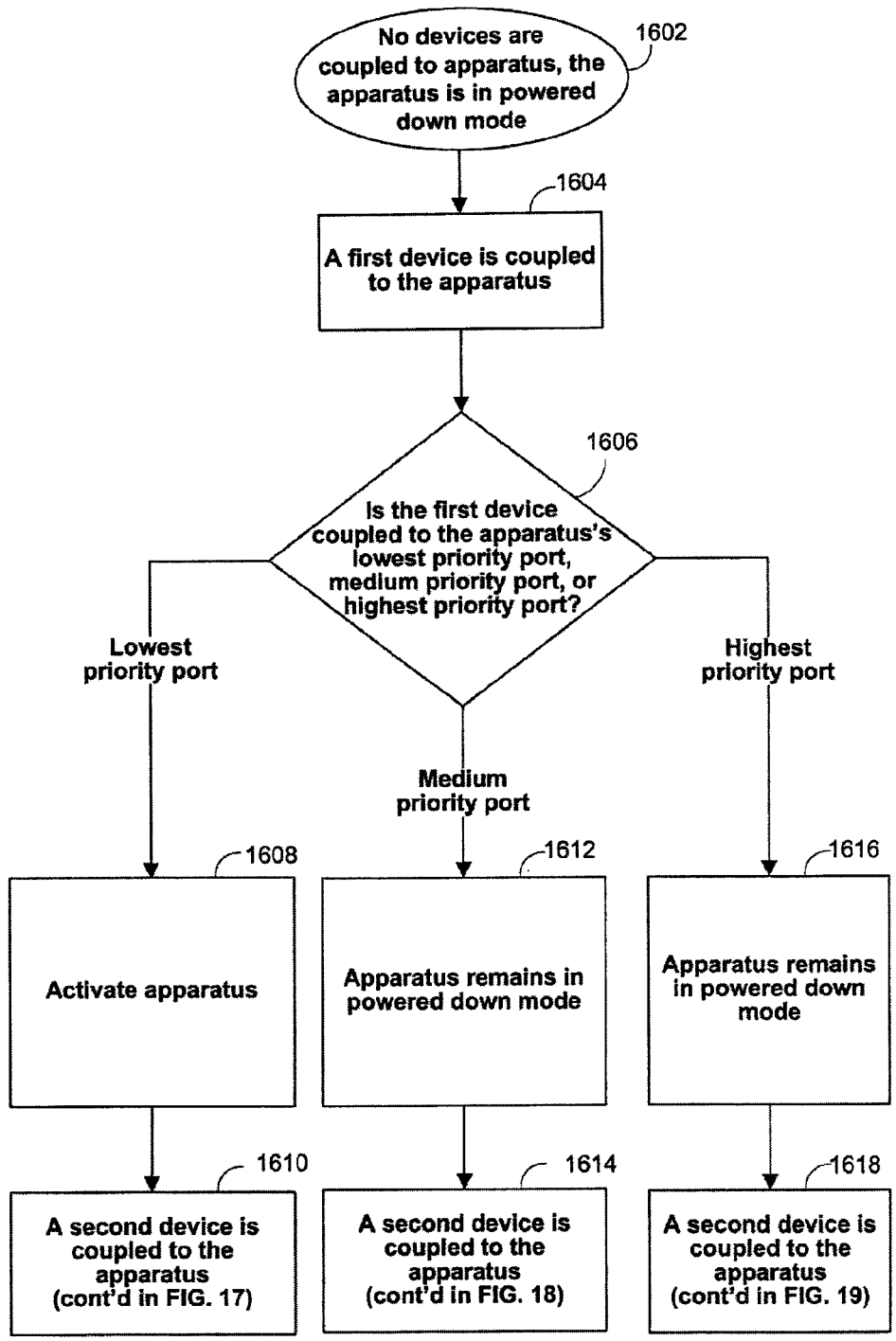
Figure 17:
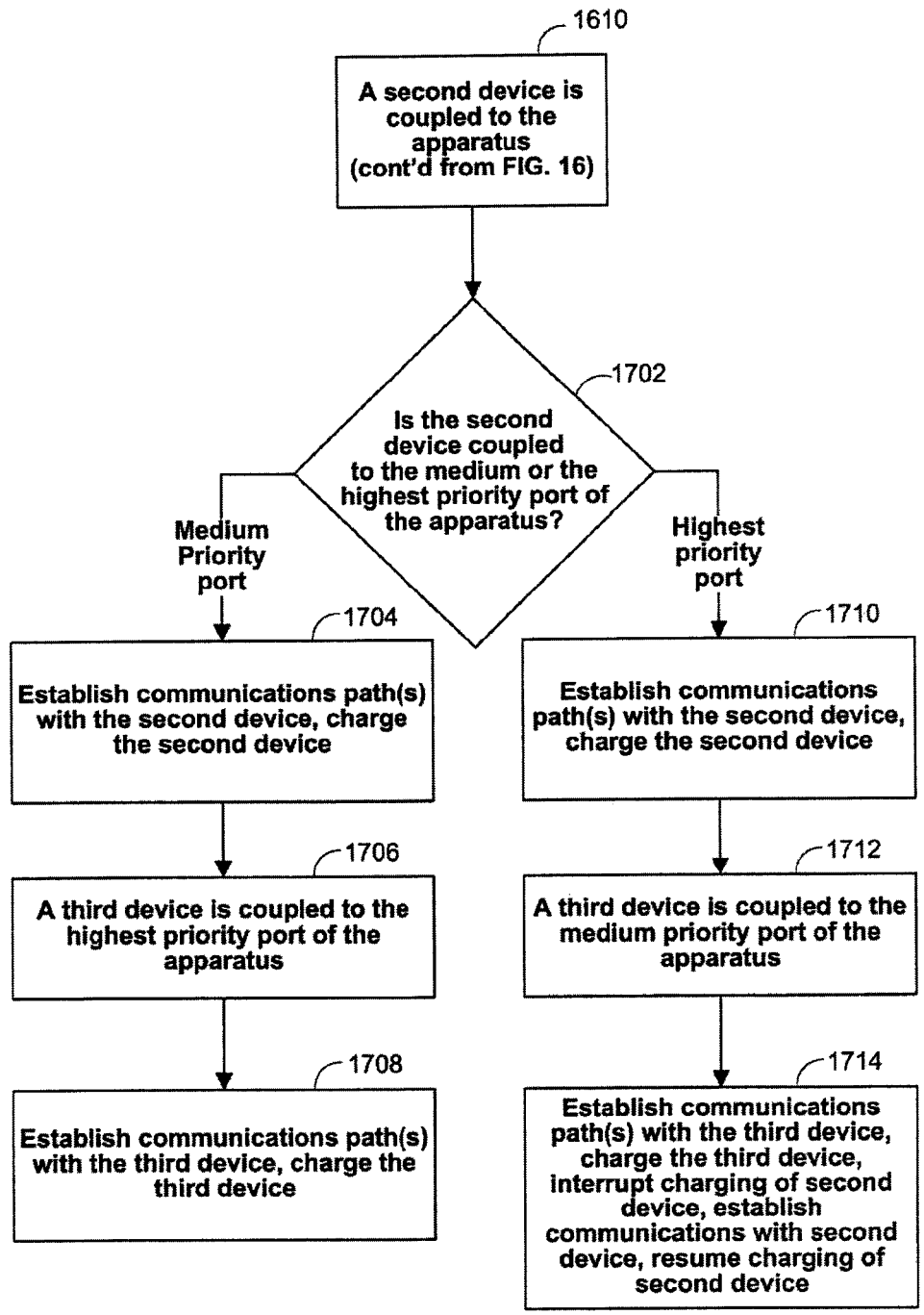
Figure 18:
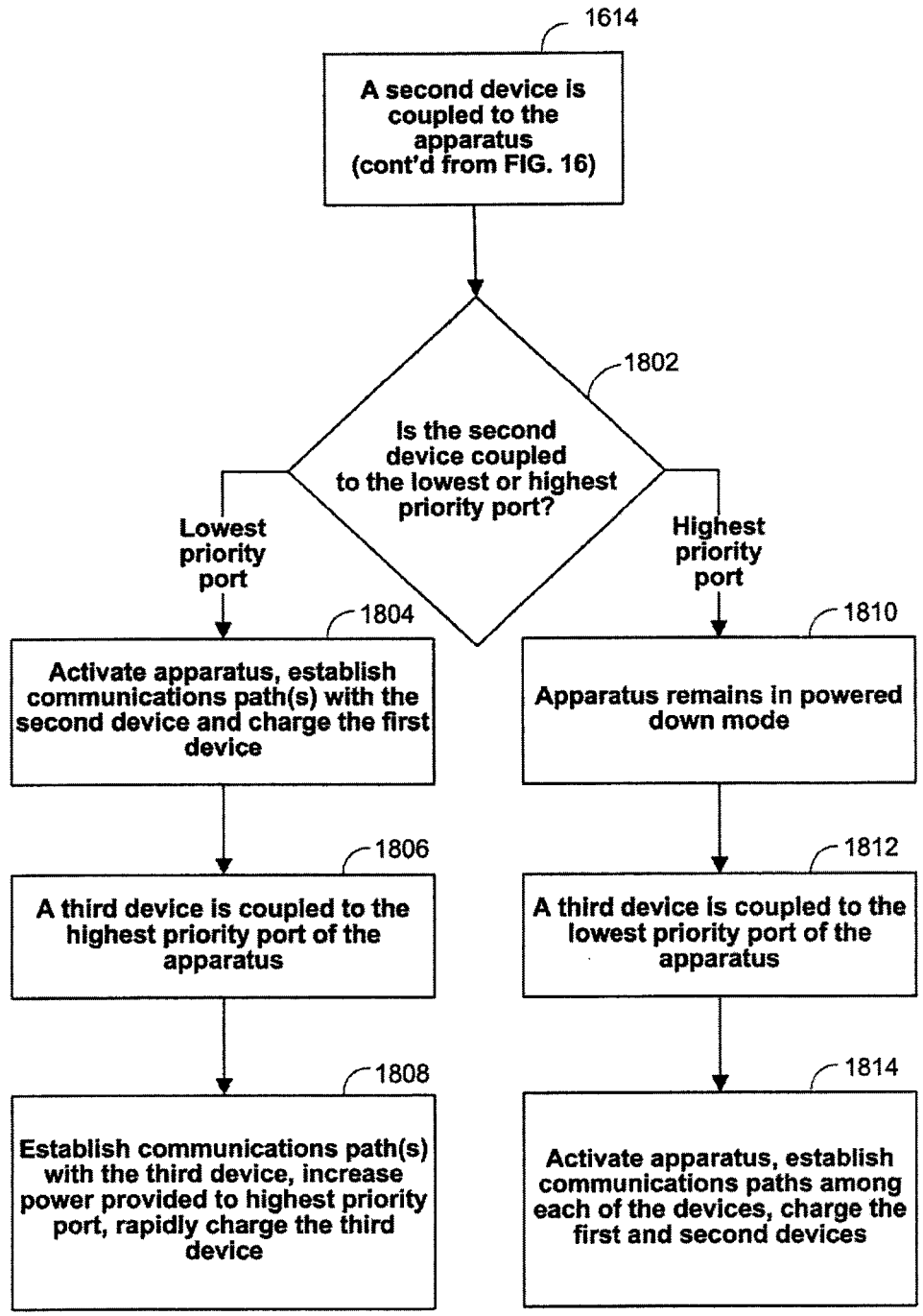

Turning to FIG. 16, the process begins at step 1602 when there are no devices coupled to an apparatus (e.g., apparatus 200 shown in FIG. 2 or apparatus 300 shown in FIG. 3). The apparatus is preferably in a powered down mode. Unlike the processes discussed above, the processes discussed in connection to FIGS. 16-22 are intended to illustrate embodiments of the present invention that require a particular device to be coupled to the apparatus before the apparatus will function. For simplicity, the processes of FIGS. 16-22 require that the particular device be the device coupled to the lowest priority port. One skilled in the art would understand that the functionality of the apparatus can be dependent on more than one particular device being coupled to the apparatus, particular ports each being coupled to a device, or anything else.

One skilled in the art would also appreciate that the process can begin at a step other than step 1602. For example, the process can begin at step 1608 (which is discussed below) when the process begins with a device already coupled to the medium priority port or when the apparatus is integrated into a medium priority device (such as, e.g., an iPod or cellular telephone 700 shown in FIGS. 7a and 7b).

At step 1604, a first device is coupled to the apparatus. Further to the priority discussion above in reference to FIG. 2, the processes discussed herein are based on an apparatus in which the ports of the apparatus are prioritized.

Step 1606 illustrates that the direction of the process can be determined in response to whether the first device is coupled to the lowest priority port (e.g., port 202), the medium priority port (e.g., port 204), or the highest priority port (e.g., port 206). The step that occurs next in the process is based on which port the first device is coupled to.

In response to the first device being coupled to the lowest priority port, the process moves from step 1606 to step 1608. In some embodiments, at step 1608, the apparatus is activated which can cause the components of the apparatus (e.g., port 202, port 204, port 206, microcontroller 214, boost 236, regulator 238, wireless emitter/receiver, etc.) to function using power from the device coupled to the lowest priority device. In step 1608, the apparatus can also begin transferring power to the higher priority ports. For example, the voltage potential at the medium and high priority ports can be raised from zero to 3.8 volts (e.g., V2). In step 1608, the apparatus can also prepare to facilitate the transfer of information between the first device and another device (that is not yet connected) by creating an information path between the lowest priority port device and another port. For example, the information switch (e.g., switch 220) can couple the highest priority port with the medium priority port (by, e.g., coupling input 222 to output 226 as shown in FIG. 2). In some embodiments the microcontroller can communicate (as discussed above in reference to FIG. 2) with the first device in step 1608.

In alternative embodiments (such as, for example, the embodiment illustrated in FIG. 3), both power and information lines of the lowest priority port can be coupled to one or more of the higher priority ports (e.g., via switch 302) at step 1608.

At step 1610 a second device is coupled to the apparatus. The process continues in FIG. 17 at step 1702, which illustrates that the direction of the process can be determined in response to which port the second device is coupled to.

When the second device is coupled to the medium priority port, step 1702 is followed by step 1704. In step 1704, the apparatus can, for example, facilitate communications (e.g., USB communications) between the first and second devices and/or communicate directly with the second device. As described above in reference to FIG. 2, the microcontroller can establish a communications path between a device and the microcontroller and/or another device. The communications path can then be used to, for example, request a particular amount of power (at a particular current and/or voltage), etc. In step 1704, the apparatus can also facilitate the charging of the second device with power from the first device (which, in some embodiments, was provided to the medium priority port in step 1608), activate the boost (e.g., boost 236, in anticipation of a third device being coupled to the highest priority port), etc.

In step 1706, a third device is coupled to the highest priority port of the apparatus. In response to a third device (e.g., device 212) being coupled to the apparatus, the process continues to step 1708.

In step 1708, the microcontroller preferably creates a communications path to the third device and communicates with the third device (e.g., using a serial communication protocol). The apparatus can also allow the second device to communicate with the third device (directly or indirectly as discussed above in reference to FIG. 2).

Also, at step 1708 and in response to the third device being coupled to the highest priority port, the apparatus can transfer a relatively high voltage to the third device for a relatively short period of time (i.e., a power spike), which can reset the third device. The power spike can be any voltage such as, for example, a voltage in the range of 4.7-5.1 volts. At step 908, the voltage, which can be provided to the highest priority port immediately or shortly after the voltage spike, can indicate to the third device which standard and/or protocol the third device should use to communicate with the apparatus and/or other device(s). The apparatus and/or the other device, which is communicating with the third device, can, for example, identify the third device, authenticate the third device, and/or perform any other necessary action required to communicate with the third device (e.g., reset the ports of the third device), handshake with the third device, negotiate the charge with the third device (i.e., communicate how much power should be provided to the third device), and/or exchange any other information (including instructions) with the third device. In response to establishing a communications path and/or exchange of communications with the third device, the apparatus can allow more power to be provided to the third device (by, e.g., deregulating the power provided to the regulator). Allowing more power (i.e., more voltage (e.g., V3) and/or current) to be provided to the third device can cause the third device to be charged more rapidly.

Returning to step 1702, the second device to be coupled to the apparatus can be coupled to the highest priority port. When the second device is coupled to the highest priority port, step 1710 follows step 1702 in the process.

In step 1710, the microcontroller of the apparatus can cause the second device to reset by sending a power spike to the second device, in response to the second device being coupled to the highest priority port. The microcontroller can also cause the apparatus to establish a communications path that allows the microcontroller to communicate with the second device (using, e.g., a USB protocol, a different serial communications protocol, or any other communications protocol). In some embodiments, the apparatus can establish a communications path that allows the first device to communicate with the second device (e.g., device 212) directly or indirectly (as discussed above in reference to FIG. 2).

As described above in reference to step 1708, the voltage, that is present at the highest priority port when the second device is initially coupled to that port, can indicate to the second device which standard and/or protocol the second device should use to communicate with the microcontroller or first device in step 1710. After the microcontroller and/or the first device communicates with the second device, the power to the highest priority port can be (completely or partially) deregulated by the microcontroller, thereby allowing the second device to be charged more rapidly.

In step 1712, a third device is coupled to the medium priority port of the apparatus. Step 1714 occurs in response to the third device (e.g., device 210) being coupled to the medium priority port, the microcontroller can temporarily interrupt or slow down the charging of the second device by, for example, regulating the power provided to the second device, updating the communications path(s) to the second device, and/or instructing the second device to reset its ports (by, e.g., providing a power spike to the highest priority port).

Step 1714 can also include establishing a communications path between the third device and the microcontroller and/or other device(s), discontinuing the communications between the first device and the second device (this can occur when, e.g., switch 220 decouples input 222 from output 224), and facilitating communications between the first device and the third device (by, e.g., using switch 220 to couple input 222 to output 226). In communicating with the third device, the microcontroller and/or one of the other devices can, for example, negotiate the charge of the third device (e.g., determine whether the third device needs to be charged, the amount of power that the third device should receive and/or provide, etc.). In response to the negotiations with the third device, the apparatus can facilitate the transfer of power to and/or from the third device. In step 1714, communications between the apparatus's microcontroller and the second device can resume (which can include any exchange of information and/or instructions) and the second device can continue to be charged with power from the first and/or third device coupled to the apparatus.

Returning to step 1606 of FIG. 16, the first device coupled to the apparatus can be coupled to the medium priority port of the apparatus. When the first device (e.g., device 210) is coupled to the medium priority port, step 1606 is followed by step 1612.

At step 1612, rather than utilize power from the device coupled to the medium priority port, the apparatus can remain in powered down mode. In this manner, the apparatus assigns itself or is hardwired to have a priority that is lower than the medium priority port.

In yet other embodiments, the priority of the apparatus can be dynamically assigned by the microcontroller of the apparatus or one of the devices coupled to the apparatus. The dynamic allocation of apparatus priority can be based on, for example, the amount of excess power that a device has when it is coupled to the apparatus.

In step 1614, a second device is coupled to the apparatus. The process is continued in FIG. 18 at step 1802. Step 1802 illustrates that the direction of the process can be determined based on which port the second device is coupled to.

When the second device is coupled to the lowest priority port and when the apparatus has a higher priority, step 1802 is followed by step 1804 in the process. In step 1804, the microcontroller can, for example, establish one or more communications paths with the first and second devices, facilitate communications (e.g., USB communications) between the first and second devices and/or communicate directly with either or each device (which can include, for example, negotiating the power transfer from the second device to the first device). Step 1804 can also include charging the first device with the power from the second device (via, e.g., line 236 shown in FIG. 2 or switch 302 shown in FIG. 3).

In step 1806, a third device is coupled to the highest priority port of the apparatus. In response to a third device (e.g., device 212) being coupled to the apparatus, the process proceeds to step 1808.

In step 1808, the microcontroller establishes one or more communications paths with the third device, facilitates communications between the third device and the microcontroller and/or the other devices (including, e.g., negotiating the power transfer to the third device). As described above, the power (e.g., V3 at a given current), that was being provided to the highest priority port when the third device was coupled to the highest priority port, can be reduced (to, e.g., zero), a power spike provided to the highest priority port to reset the third device, and then begin charging the third device with power from, e.g., the first device (while the first device is charged by the second device). The amount of power used to charge the third device an also be used by the apparatus to indicate to the third device which communications protocol and/or standard should be used to communicate with the microcontroller and/or the other devices. The microcontroller can then increase the power provided to the highest priority port (to, e.g., V3 at a given current) by, for example, deregulating (completely or partially) the power from the boost, and facilitate the rapid charge of the third device.

Returning to step 1802, when the second device coupled to the apparatus is coupled to the highest priority port, step 1810 is after step 1802 in the process.

At step 1810, in this embodiment, the apparatus remains in powered down mode, until a device is coupled to the lowest priority port.

At step 1812, a device is coupled to the lowest priority port and the apparatus is activated, causing, for example, the first device to be charged by the first device and the second device to be charged by the first device. In addition, at step 1812, the microcontroller of the apparatus can establish communications paths among each of the devices, etc. A power spike can also be provided to one or more of the devices coupled to the medium and/or highest priority ports in response to a device being coupled to the lowest priority port. One skilled in the art would appreciate that step 1814, as well as any other step herein, can be conditioned on a number of things, such as, e.g., the device coupled to the lowest priority port having excess power, each device being compatible with each other and the apparatus, etc.

Returning to step 1606 of FIG. 16, the first device coupled to the apparatus can be coupled to the highest priority port of the apparatus. When the first device (e.g., device 212) is coupled to the highest priority port, the process flows from step 1606 to step 1616 at which the device remains in powered down mode.

Figure 19:
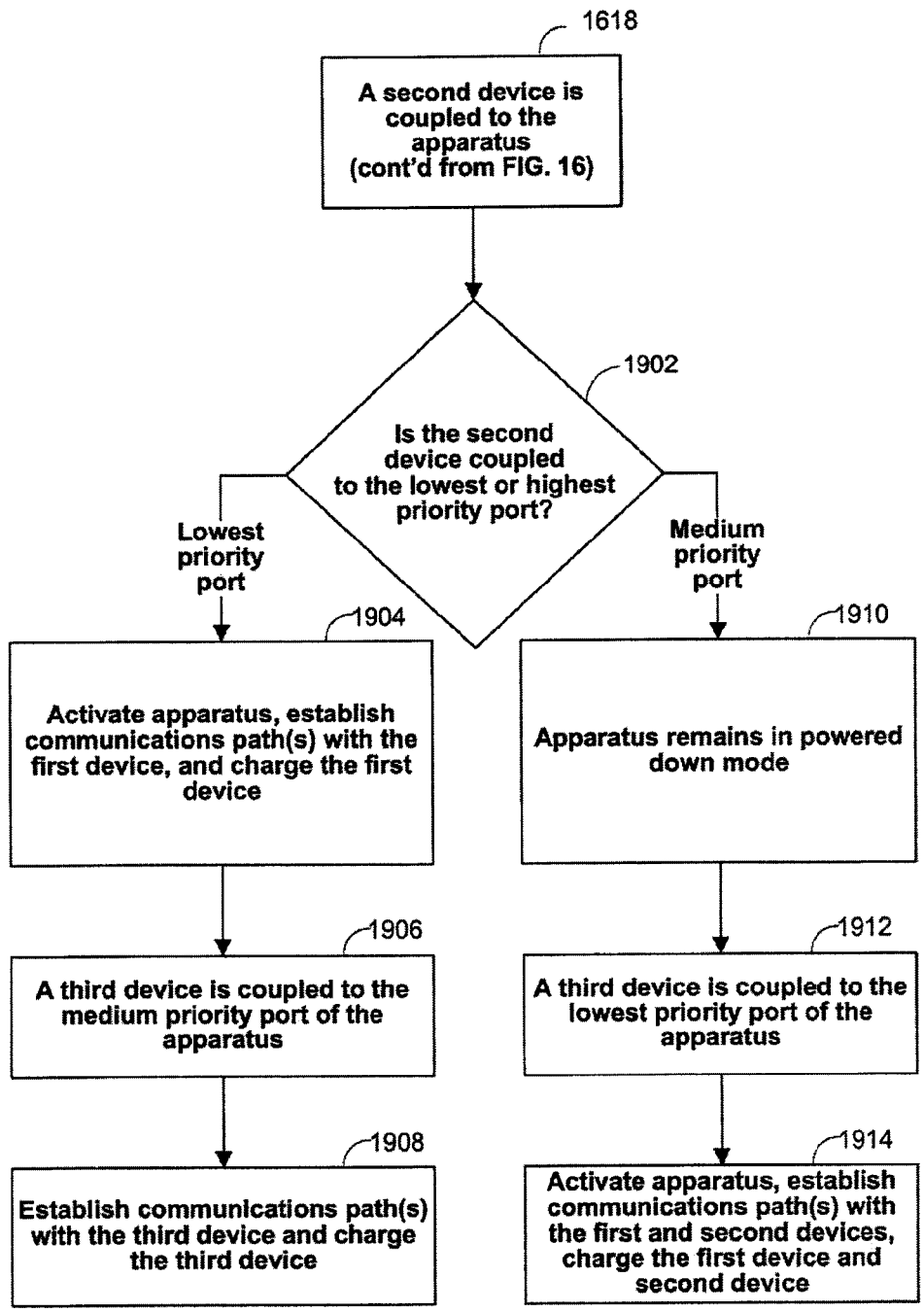

In step 1618, a second device is coupled to the apparatus and the process continues in FIG. 19. Step 1902 of FIG. 19 illustrates that the direction of the process can be determined based on which port the second device is coupled to. The process proceeds to step 1904 in response to the second device being coupled to the lowest priority port.

In some embodiments, the apparatus is activated at step 1904 in response to a device being coupled to the lowest priority port. In some embodiments, when the apparatus is activated and there is already a device coupled to the highest priority port, the microcontroller of the apparatus can cause a power spike to be provided to the highest priority port. The power used for the power spike can be power that is transferred from the device coupled to the lowest priority port. At step 1904, the apparatus also establishes communications path(s) with the first device and transfers power from the second device to the first device.

At step 1906 a third device is coupled to the medium priority port of the apparatus. In response to the third device being coupled to the medium priority port of the apparatus, the process proceeds to step 1908.

In step 1908, in response to the third device being coupled to the medium priority port, the apparatus can interrupt the transfer of power and information communications between the first and second devices. The apparatus can also reduce the power being provided to the first device (to, e.g., zero) and then reset any of the device (by, e.g., sending a power spike). In addition, at step 1908, the microcontroller can establish communication paths with and among each of the devices, begin charging the third device (using power transferred from the second device), and resume charging the first device (with, e.g., power transferred from the third device).

Returning to step 1902, when the second device coupled to the apparatus is coupled to the medium priority port, the process proceeds to step 1910 after step 1902.

In step 1910, the apparatus remains in powered down mode awaiting a device to be coupled to the lowest priority port.

At step 1912, a third device is coupled to the lowest priority port of the apparatus and, in response, the process proceeds to step 1914.

In step 1914, the apparatus is activated and microcontroller of the apparatus can reset one or more of the devices, establish one or more communication paths and facilitate communications with and/or among each of the three devices. The apparatus can also facilitate the charging of the devices coupled to the medium and highest priority ports.

Figure 20:
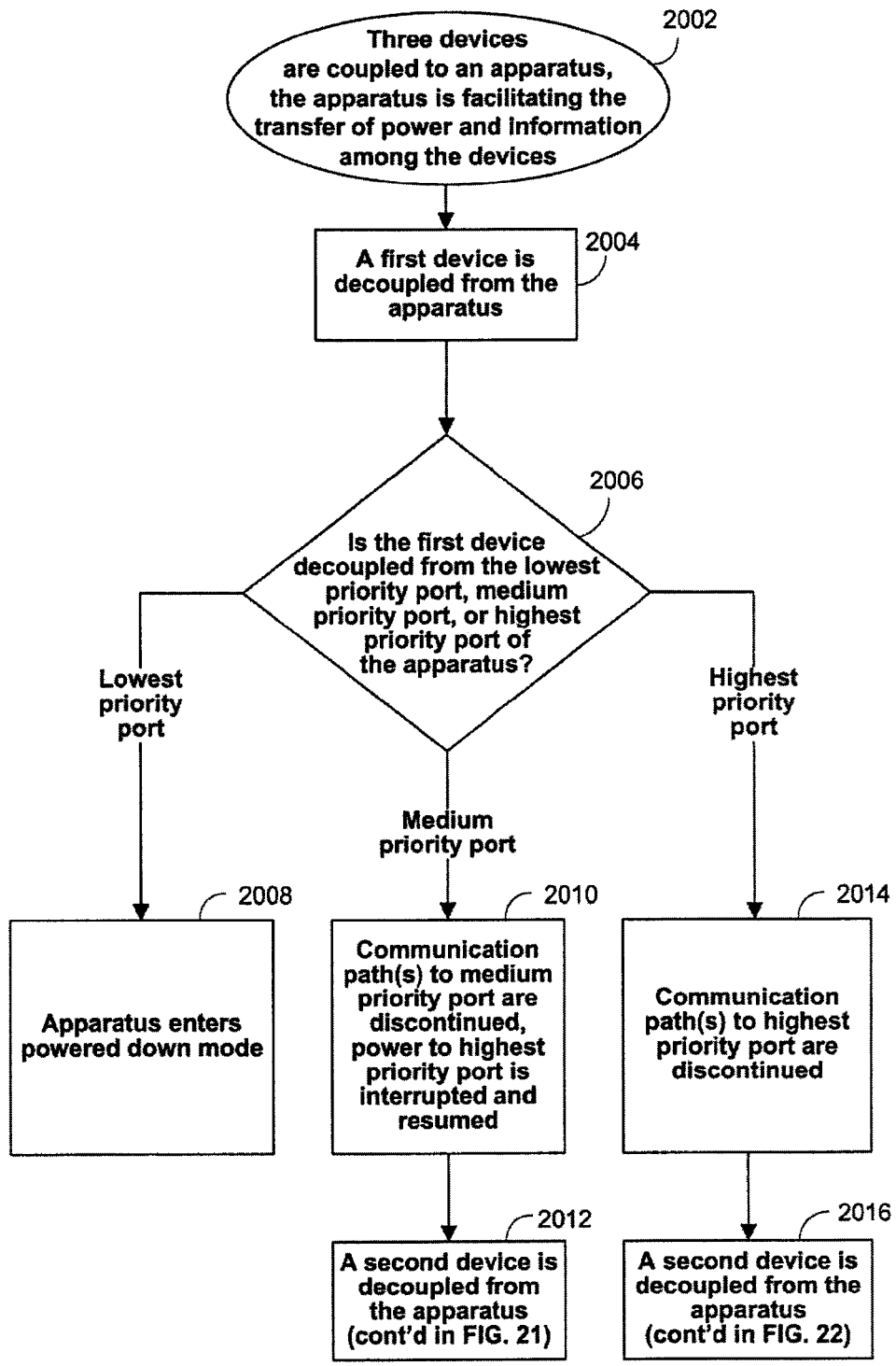
Figure 21:
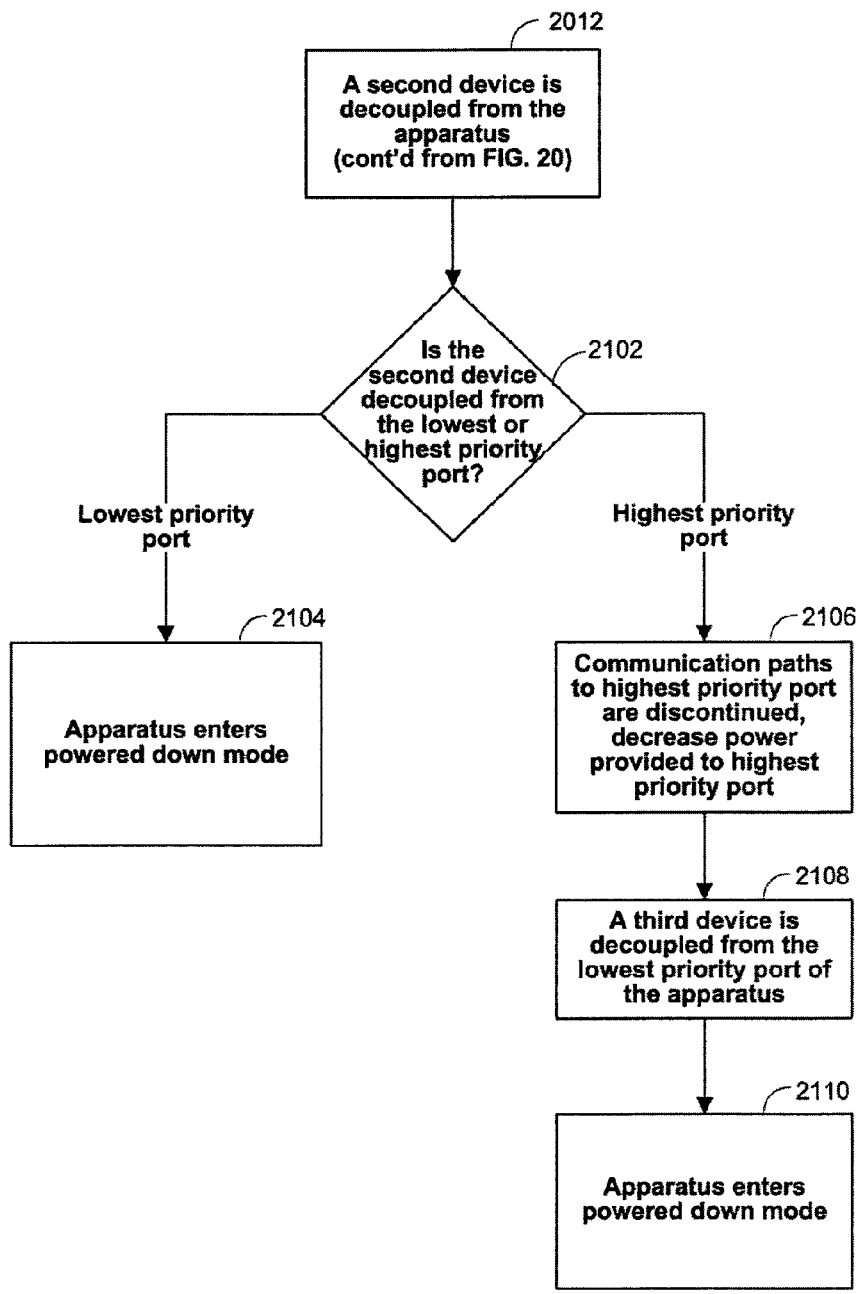
Figure 22:
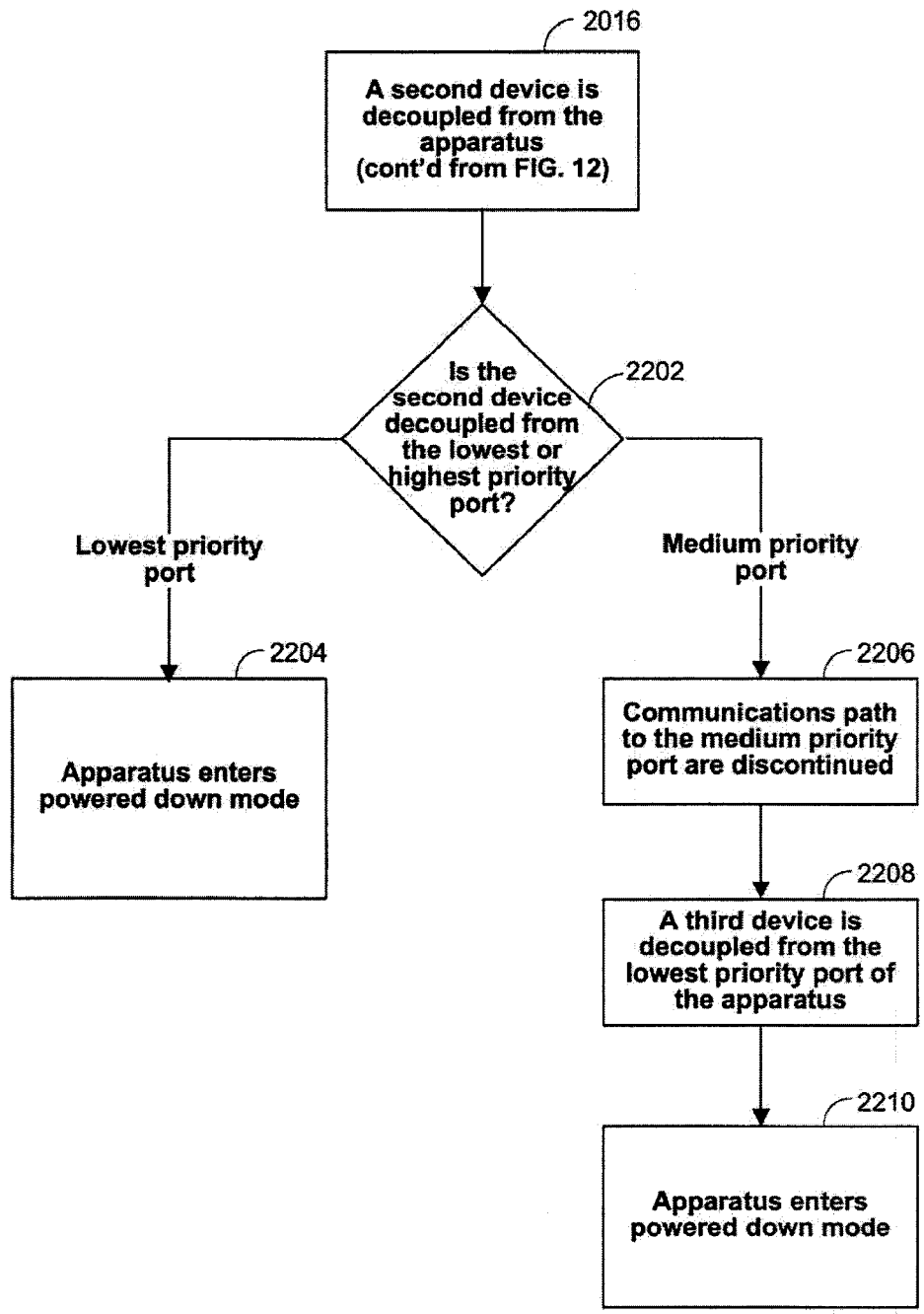

FIGS. 20-22 illustrate the steps that can occur when one or more devices are decoupled from an apparatus that was discussed herein in reference to the embodiment of the present invention (i.e., that similar to or the same as apparatus 200).

For the purpose of illustration, the process of removing devices begins at step 2002 with a device coupled to each of the three ports of the apparatus. One skilled in the art would appreciate that the process shown in FIGS. 20-22 can begin at a different step (i.e., other than step 2002), because, for example, the first device is decoupled from the apparatus when there is only one, two or more than three devices coupled to the apparatus.

In step 2002, the apparatus is facilitating the transfer of power and information among the device as described above. A first device is decoupled from the apparatus in step 2004. Step 2006 illustrates that the direction of the process can be determined in response to whether the first device is decoupled from the lowest priority port (e.g., port 202), the medium priority port (e.g., port 204), or the highest priority port (e.g., port 206) of the apparatus.

When the first device is decoupled from the lowest priority port, the process proceeds to step 2008 from step 2006. In some embodiments, at step 2008 the apparatus enters powered down mode. This can occur, because, for example, the apparatus is assigned a higher priority than the devices coupled to it and/or the ports of the apparatus.

Returning to step 2006, the first device decoupled from the apparatus can be decoupled from the medium priority port of the apparatus. When the first device (e.g., device 210) is decoupled from the medium priority port, step 2006 is followed by step 2010.

At step 2010, the microcontroller powers down the boost (e.g., boost 240) and discontinues communications to and from the medium priority port. For example, the information switch (e.g., switch 220 shown in FIG. 2) can be switched to couple the lowest priority port with the highest priority port. While the switching is occurring, the charging of the device coupled to the highest priority port can be interrupted (especially when power from the first device was being used to charge the device coupled to the device coupled to the highest priority port).

At step 2012, a second device is decoupled from the apparatus and the process advances to FIG. 21. A determination is made at step 2102 as which port the second device was decoupled from.

When the second device is decoupled from the lowest priority port, the process proceeds to step 2104 in which the microcontroller determines that the only device coupled to the apparatus is coupled to highest priority port and the apparatus enters the powered down mode.

Returning to step 2102, the second device that is decoupled from the apparatus can be the device coupled to the highest priority port and the process proceeds to step 2106. When the second device is decoupled from the highest priority port, the microcontroller determines that the only device coupled to the apparatus is coupled to lowest priority port. In step 2106, communications to the highest priority port are discontinued by the microcontroller. The microcontroller can also instruct the regulator to regulate the power provided to the highest priority port (to, e.g., V2).

In step 2108, the third device is decoupled from the lowest priority port of the apparatus. In step 1414, with no devices coupled to the apparatus, the apparatus can remain in powered down mode.

Returning to step 2006 of FIG. 20, the first device decoupled from the apparatus can be decoupled from the highest priority port of the apparatus. When the first device (e.g., device 212) is decoupled from the highest priority port, step 2014 follows step 2006.

At step 2014, in response to the first device being decoupled from the highest priority port, the microcontroller can determine that there is no longer a device coupled to the highest priority port and discontinue communications to the highest priority port. The microcontroller can also instruct the regulator to regulate the power provided to the highest priority port in step 2014.

In step 2016, a second device is decoupled from the apparatus and the process advances to FIG. 22. Step 2202, which follows step 2016, illustrates that the next step of the process can be determined based on which port the second device is decoupled from.

When the second device is decoupled from the lowest priority port, the microcontroller can cause the apparatus to enter powered down mode.

Returning to step 2102, the second device that is decoupled from the apparatus can be the device coupled to the medium priority port. When the second device is decoupled from the medium priority port of the apparatus, the microcontroller determines that the only device still coupled to the apparatus is coupled to lowest priority port. In some embodiments, the process advances to step 2206.

In step 2206, communications to the medium priority port are discontinued. The microcontroller can also instruct the boost to power down.

In step 2208, the third device is decoupled from the lowest priority port of the apparatus. In step 2210, with no devices coupled to the apparatus, the apparatus can enter powered down mode.

One skilled in the art would appreciate that the processes described herein can be modified without departing from the spirit of the present invention. For example, any of the steps described herein can include indicating (via, e.g., a user-interface, such as a display screen, LED, etc.) that a step was completed (successfully or unsuccessfully), that a device is properly coupled to the apparatus, that a device is charging, what is occurring during each step (e.g., to a user, to a device, etc.), etc. As another example, the processes described herein can be modified and applied to an apparatus that does not include all of the components of the apparatuses referenced by the methods described herein (e.g., when a boost is not included in the apparatus, the process will not activate the boost, etc.). The methods that collectively create the processes described herein can also be modified to apply to, for example, an apparatus that includes additional components or functionality (such as, e.g., a wireless receiver/emitter, the ability to prioritize the devices as opposed to the ports, etc.). As another example, the order of steps can be rearranged in alternative embodiments. Power from a component (e.g., port 204), for example, can be regulated first and boosted second when a device is coupled to the apparatus that requires such an order of events.

One skilled in the art would also understand that in alternative embodiments the steps in the preferred process, many of which are described herein as being inherently automatic, can require an user interaction. For example, the apparatus can not begin to facilitate the charge to or from a device unless the user first authorizes the apparatus or device to do so (e.g., via a user interface, by interacting with one of the devices coupled to the apparatus, etc.).

What is claimed is:

1. An apparatus that facilitates the charging of a first battery powered device and a second battery powered device, comprising:
    a first port that electrically couples the first battery powered device to the apparatus;
    a second port that electrically couples a second battery powered device to the apparatus;
    a third port that electrically couples a third device to the apparatus; and
    a microcontroller that:
        prevents a battery of the first device coupled to the first port from supplying power to a battery of the second device coupled to the second port when it is determined that the first and second devices are coupled to their respective first and second ports, but the third device is not coupled to the third port, and the first device is capable of supplying power to the second device;
        selecting one of at least two communications modes for the second device when the second device is determined to be coupled to the second port; and
        enables the first port to supply power to the second port when the first, second, and third devices are coupled to their respective first, second, and third ports, wherein a voltage level of a power signal provided to the second port is controlled based on the selected communications mode.

2. The apparatus of claim 1, wherein the first device is a cellular telephone.

3. The apparatus of claim 1, wherein the first device is an media player.

4. The apparatus of claim 1, wherein the first port is a 30-pin connector.

5. The apparatus of claim 1, wherein the second device is wireless headset that is used with a cellular telephone.

6. The apparatus of claim 1, wherein the microcontroller facilitates a transfer of information between the first and second devices.

7. The apparatus of claim 1, wherein the microcontroller facilitates a transfer of information between the second and third devices.

8. The apparatus of claim 1, wherein the microcontroller facilitates a transfer of information between the first and third devices.

9. The apparatus of claim 1, wherein the third port receives a USB cable that couples the apparatus to the third device, wherein the third device is a computer.

10. A method that facilitates the charging of at least one battery powered electrical device using an apparatus comprising a first port, a second port, and a third port, the method comprising:
    determining whether a first device, second device, or third device are electrically coupled to respective first, second, and third ports;
    selecting one of at least two communications modes for the second device when the second device is determined to be coupled to the second port;
    preventing a battery of the first device coupled to the first port from supplying power to a battery of the second device coupled to the second port when it is determined that the first and second devices are coupled to their respective first and second ports, but the third device is not coupled to the third port, and the first device is capable of supplying power to the second device; and
    enabling the first port to supply power to the second port when the first, second, and third devices are coupled to their respective first, second, and third ports, wherein a voltage level of a power signal provided to the second port is controlled based on the selected communications mode.

11. The method of claim 10 further comprising facilitating a transfer of information between the first and second devices.

12. The method of claim 10 further comprising identifying the third device as a device that has access to a continuous source of power.

13. The method of claim 10 further comprising identifying the third device as being a USB cable to a computer.

14. The apparatus of claim 1, further comprising:
    a switch having first, second, and third inputs, the first input coupled to the third port, and an output coupled to the second port;
    a boost coupled to the second input of the switch and the first port; and
    a regulator coupled to the third port, the boost and the third input of the switch.

15. The apparatus of claim 14, wherein the microcontroller is operative to select the second input when the first, second, and third devices are coupled to respective first, second, and third ports, and the selected communications mode is a first communications mode.

16. The apparatus of claim 14, wherein the microcontroller is operative to select the third input when the first, second, and third devices are coupled to respective first, second, and third ports, and the selected communications mode is a second communications mode.

17. The method of claim 10, wherein the voltage level of the power signal provided by the first port is controlled by boosting the voltage level to a boosted voltage level, wherein the boosted voltage level has a higher voltage level than the voltage of the power signal provided by the first port.

18. The method of claim 17, wherein the voltage level of the power signal provided by the first port is further controlled by regulating the boosted voltage level to a regulated voltage level, wherein the regulated voltage level is lower than the boosted voltage level but higher than the voltage level of the power signal provided by the first port.

19. The method of claim 18, wherein the regulated voltage level is provided to the second port when the selected communications mode is a first communications mode and wherein the boosted voltage level is provided to the second port in a when the selected communications mode is a second communications mode.

20. The method of claim 10, further comprising: assigning priorities to the first, second, and third ports.

21. The method of claim 10, wherein one of the communications modes is a USB mode.

22. The method of claim 10, wherein one of the communications modes is a serial mode.

* * * * *